US012748525B2

(12) United States Patent
Li et al.

(10) Patent No.: US 12,748,525 B2
(45) Date of Patent: Sep. 29, 2026

(54) TOUCH-CONTROL AFFORDANCE POSITION CUSTOMIZATION FOR A DISPLAY DEVICE

(71) Applicant: Microsoft Technology Licensing, LLC, Redmond, WA (US)

(72) Inventors: Lei Li, Shenzhen (CN); Meng Yeow Tay, Kuantan (MY); Xiaole Zhao, Singapore (SG)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/833,995

(22) PCT Filed: Mar. 18, 2022

(86) PCT No.: PCT/CN2022/081588
§ 371 (c)(1),
(2) Date: Jul. 29, 2024

(87) PCT Pub. No.: WO2023/173388
PCT Pub. Date: Sep. 21, 2023

(65) Prior Publication Data

US 2025/0138721 A1 May 1, 2025

(51) Int. Cl.
*G06F 3/0488* (2022.01)
*G06F 3/0354* (2013.01)
(Continued)

(52) U.S. Cl.
CPC ........ *G06F 3/0488* (2013.01); *G06F 3/03545* (2013.01); *G06F 3/04815* (2013.01);
(Continued)

(58) Field of Classification Search
CPC ............... G06F 3/0488; G06F 3/03545; G06F 3/04815; G06T 7/20; G06T 7/70; G06T 2207/20084; G06T 2207/30196
See application file for complete search history.

(56) References Cited

U.S. PATENT DOCUMENTS 5,831,862 A * 11/1998 Hetrick .................. G07F 9/023 221/9
8,836,646 B1 9/2014 De Rose et al.
(Continued)

FOREIGN PATENT DOCUMENTS

JP 2004258766 A 9/2004
KR 20140037464 A 3/2014
(Continued)

OTHER PUBLICATIONS

Hutchinson, et al., "Human-Computer Interaction Using Eye-Gaze Input", IEEE Transactions on Systems, Man, and Cybernetics, vol. 19, Issue 6, Nov. 1989, pp. 1527-1534.
(Continued)

*Primary Examiner* — David D Davis
(74) *Attorney, Agent, or Firm* — Alleman Hall LLP

(57) ABSTRACT

A method of customizing interactive control for a large-format touch-sensitive display device (LFTSDD) is disclosed. One or more images of a scene in front of the LFTSDD are received via a camera of the LFTSDD. The one or more images are computer-analyzed to recognize a human subject in the scene and a location of the human subject relative to the LFTSDD. A variable interaction zone of a display screen of the LFTSDD is determined based at least on the recognized location of the human subject relative to the LFTSDD. The variable interaction zone is smaller than the display screen and positioned a designated distance in front of the human subject on the display screen based at least on the recognized location of the human
(Continued)

subject relative to the LFTSDD. A touch control affordance is visually presented in the variable interaction zone of the display screen of the LFTSDD.

14 Claims, 14 Drawing Sheets

(51) Int. Cl.
*G06F 3/04815* (2022.01)
*G06T 7/20* (2017.01)
*G06T 7/70* (2017.01)

(52) U.S. Cl.
CPC .................. *G06T 7/20* (2013.01); *G06T 7/70* (2017.01); *G06T 2207/20084* (2013.01); *G06T 2207/30196* (2013.01)

(56) References Cited

U.S. PATENT DOCUMENTS

2004/0075735 A1* 4/2004 Marmaropoulos ..... G06F 3/011 348/51
2006/0139314 A1 6/2006 Bell
2009/0313125 A1* 12/2009 Roh .......................... G07F 9/02 345/173
2011/0267374 A1 11/2011 Sakata et al.
2012/0102438 A1 4/2012 Robinson
2012/0249416 A1 10/2012 Maciocci et al.
2014/0071159 A1 3/2014 Ye et al.
2014/0123183 A1 5/2014 Fujimoto et al.
2017/0068414 A1 3/2017 Plumb
2017/0090666 A1* 3/2017 Pahud ..................... G06F 3/038
2017/0262991 A1* 9/2017 Davidson ................ G06T 7/162

FOREIGN PATENT DOCUMENTS

KR 20190114574 A 10/2019
KR 20220016703 A 2/2022
WO WO-2011049251 A1 * 4/2011 .............. G06F 3/011
WO 2017044511 A1 3/2017
WO 2021169569 A1 9/2021

OTHER PUBLICATIONS

International Search Report and Written Opinion Issued in PCT Application No. PCT/CN22/081588, Sep. 9, 2022, 12 pages.

* cited by examiner

TOUCH-CONTROL AFFORDANCE POSITION CUSTOMIZATION FOR A DISPLAY DEVICE

CROSS REFERENCE TO RELATED APPLICATIONS

The present application is a U.S. National Phase of International Patent Application Serial No. PCT/CN2022/081588 entitled "INTERACTION CUSTOMIZATION FOR A LARGE-FORMAT DISPLAY DEVICE", filed Mar. 18, 2022, the entire contents of which are hereby incorporated by reference for all purposes.

BACKGROUND

A large-format touch-sensitive display device (LFTSDD) can enable a plurality of users in a common physical space to collectively view content visually presented on the LFTSDD. Further, the touch-sensing functionality of the LFTSDD can enable such users to naturally interact with the displayed content, for example, by allowing a user to annotate content with their fingers or write with a stylus. In some examples, multiple users can interact with the LFTSDD simultaneously to facilitate natural collaboration. Because of the large format, a user may have to move in order to reach all parts of the LFTSDD.

SUMMARY

A method for customizing interactive control of a large-format touch-sensitive display device (LFTSDD) is disclosed. One or more images of a scene in front of the LFTSDD are received via a camera of the LFTSDD. The one or more images are computer-analyzed to recognize a human subject in the scene and a location of the human subject relative to the LFTSDD. A variable interaction zone of a display screen of the LFTSDD is determined based at least on the recognized location of the human subject relative to the LFTSDD. The variable interaction zone is smaller than the display screen and positioned a designated distance in front of the human subject on the display screen based at least on the recognized location of the human subject relative to the LFTSDD. A touch control affordance is visually presented in the variable interaction zone of the display screen of the LFTSDD.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1A:
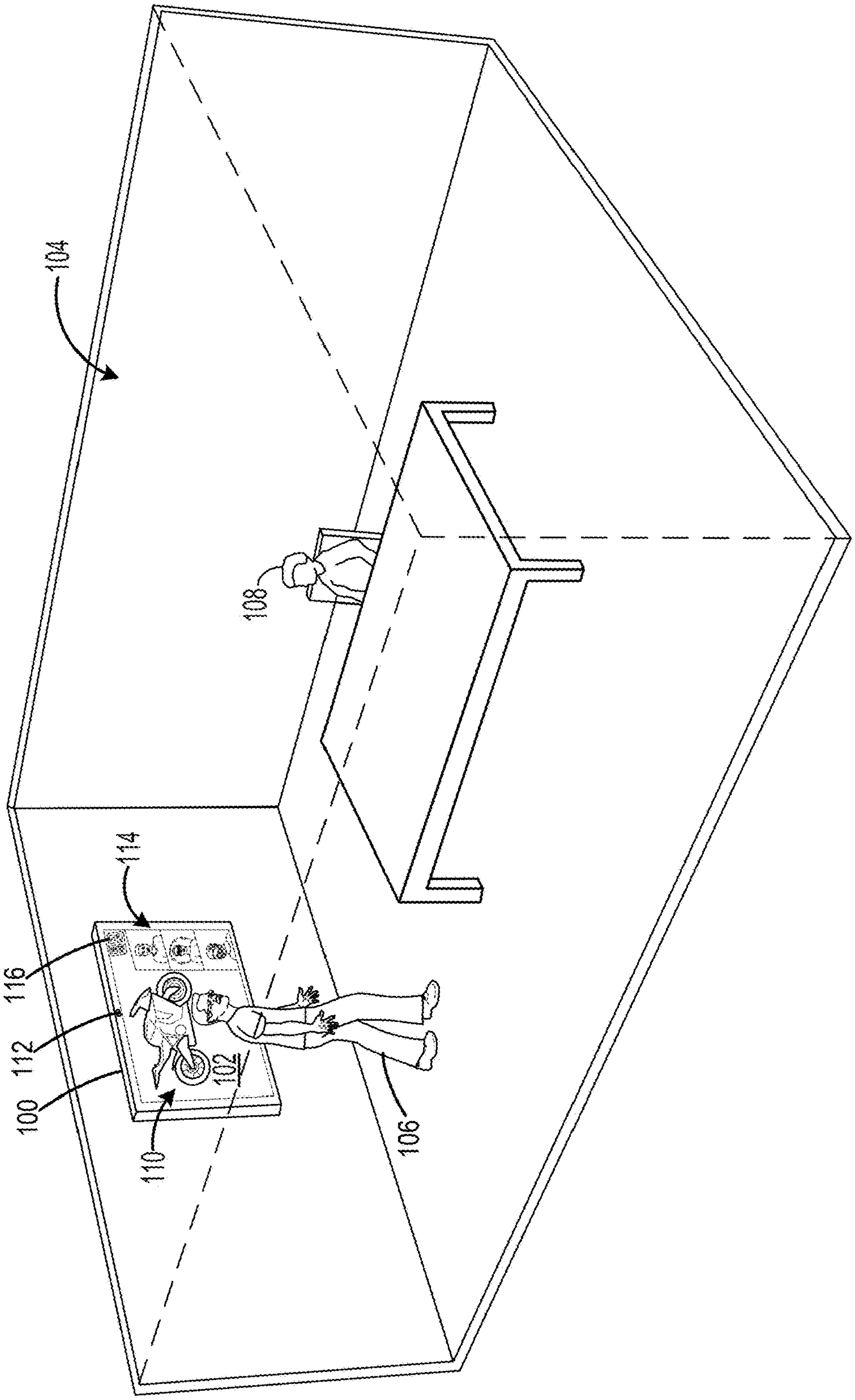
FIG. 1A-1C show an example large-format touch-sensitive display device (LFTSDD) configured to visually present a touch control affordance in a fixed position on a display screen of the LFTSDD.
Figure 1B:
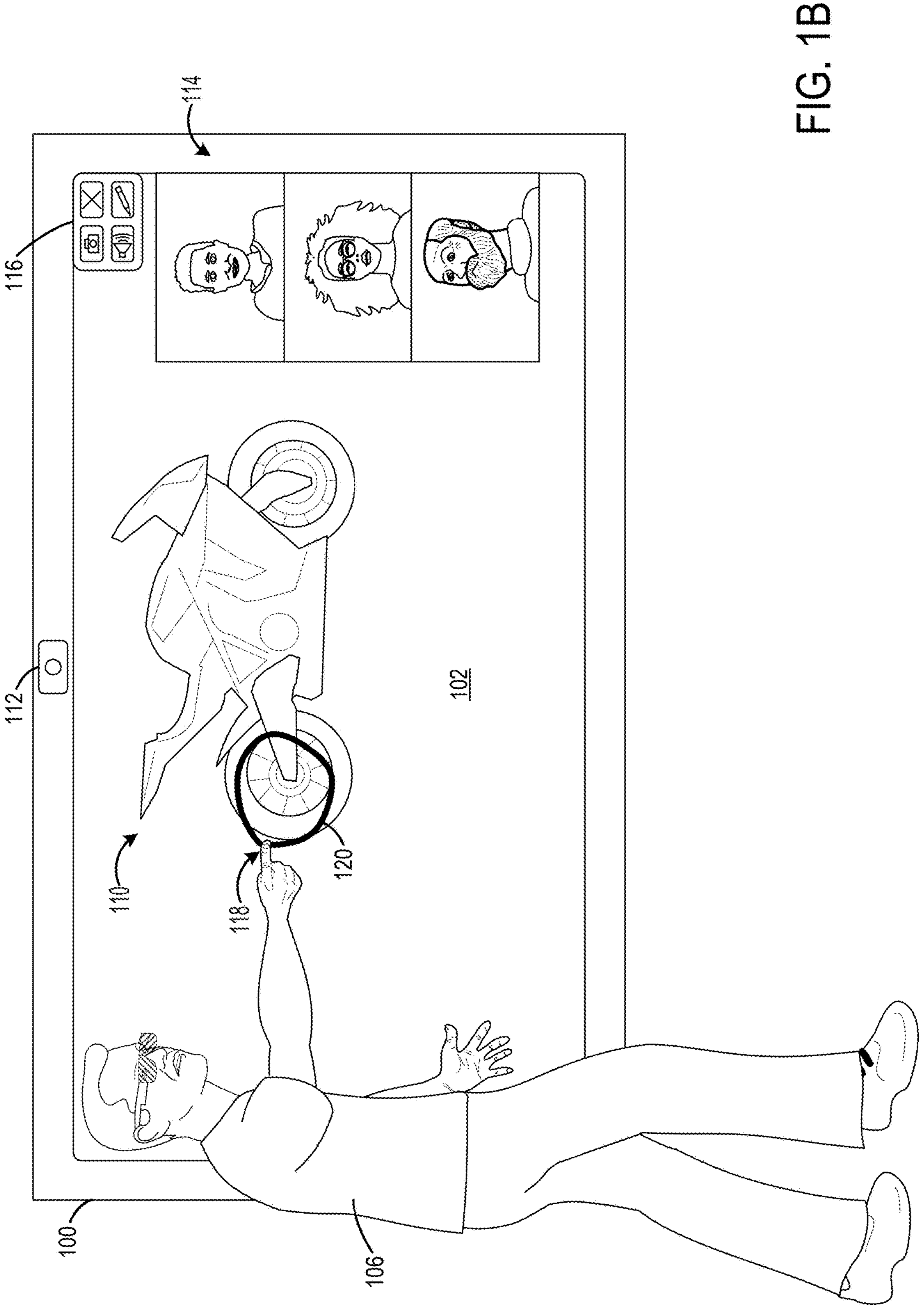
Figure 1C:
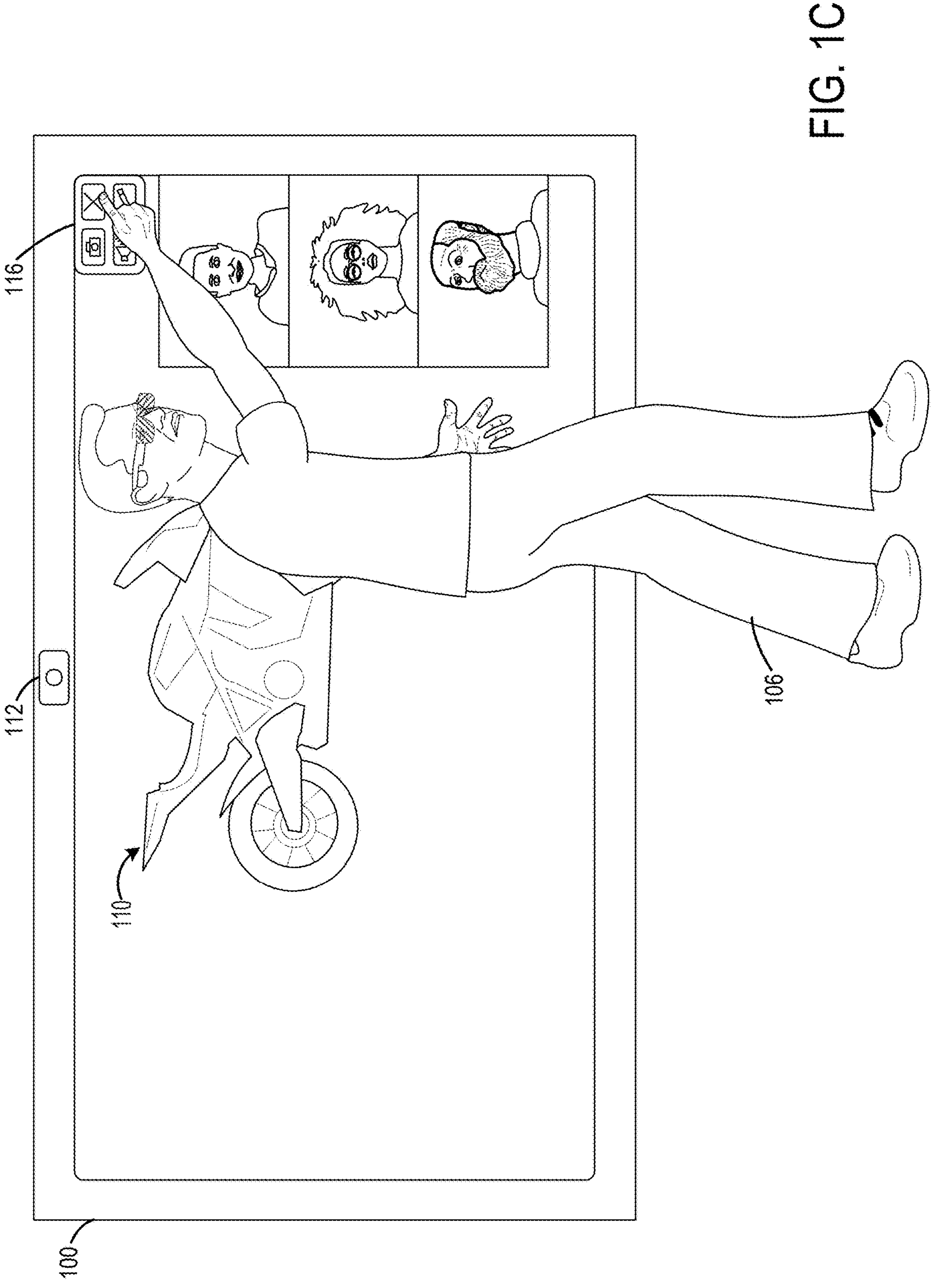

FIGS. 1A-1C show an example LFTSDD 100 having a user interface (UI) 102 that lacks customization for individual users. As shown in FIG. 1A, the LFTSDD 100 is positioned in a physical space in the form of a conference room 104. A first user 106 interacts with of the LFTSDD 100 to convey information to a second user 108 that is positioned locally in the conference room 104. In the illustrated example, the UI 102 includes content 110 in the form of a diagram of a motorcycle. Additionally, the LFTSDD 100 is configured to capture video imagery of the conference room 104 via a camera 112 of the LFTSDD 100. The video imagery as well as content 110 visually presented in the UI 102 of the LFTSDD 100 are sent to a plurality of remote users 114 to facilitate a video conference between the first and second users 106, 108 and the plurality of remote users 114. For example, the first and second users 106, 108 and the plurality of remote users 114 may be collaborating to design the motorcycle visually presented in the UI 102.

As shown in FIG. 1B, the first user 106 is standing on the left side of the LFTSDD 100 and the first user 106 is interacting with the UI 102 by providing touch input 118 to the LFTSDD 100. In the illustrated example, the first user 106 draws a touch path around a rear wheel of the motorcycle. In response to detecting the touch input 118, the LFTSDD 100 visually presents visual feedback in the form of a ring 120 that traces the touch path of the user input 118 and highlights the rear wheel of the motorcycle.

Furthermore, the UI 102 includes a touch control affordance 116 having a fixed position in the upper right corner the UI 102. The touch control affordance 116 allows for the user to provide touch input to the touch control affordance 116 to control different aspects of the LFTSDD 100. For example, the touch control affordance 116 may include virtual "buttons" that control management of application program windows in the UI 102 (e.g., opening, closing, re-sizing, and/or positioning of such application program windows); annotate content visually presented in the UI 102; capture screen shots of the UI 102; and adjust audio settings of the LFTSDD 100. The touch control affordance 116 may be configured to allow a user to control any suitable functionality of the LFTSDD 100.

While interacting with the LFTSDD 100, the first user 106 may desire to change an aspect of the LFTSDD 100 by interacting with the touch control affordance 116. As shown in FIG. 1C, in order for the first user 106 to interact with the touch control affordance 116, the first user 106 is required to move from the left side of the LFTSDD 100 (as shown in FIG. 1B) to the right side of the LFTSDD 100. Further, the first user 106 has to reach up and out to touch the touch control affordance 116 in the upper right corner of the LFTSDD 100. Such static positioning of the touch control affordance 116 in the UI 102 makes for inefficient user interaction, because the first user 106 has to move back and forth in front of the LFTSDD 100 to interact with the touch control affordance 116. Moreover, such static positioning of the touch control affordance 116 may cause the first user 106 to lose focus on an interaction, because the first user 106 has to stop the interaction and walk across the LFTSDD 100 to interact with the touch control affordance 116. Further, the first user 106 obscures the content 110 from being viewed by the second user 108 while the first user 106 is interacting with the touch control affordance 116. Further still, the touch control affordance 116 may be difficult to reach for shorter users. For at least all of these reasons, a LFTSDD having a touch control affordance in a fixed position does not optimize efficiency of user movement when a user is interacting with the LFTSDD.

Accordingly, the present description is directed to an approach for customizing interactive control of a LFTSDD by visually presenting a touch control affordance in a variable interaction zone of a display screen of the LFTSDD. The variable interaction zone is determined based at least on a location of a recognized human subject relative to the LFTSDD. The location of the human subject is recognized based at least on computer analysis of one or more images captured by a camera of the LFTSDD. The variable interaction zone is positioned a designated distance in front of the human subject on the display screen, so that the human subject can provide touch input to interact with the touch control affordance from the recognized location. In other words, the position of the touch control affordance varies as the location of the human subject varies, so that the touch control affordance remains conveniently accessible to the human subject. Such variable positioning of the touch control affordance provides the technical effect of reducing a burden of user input to a computing device, because the human subject is not required to walk back and forth across the LFTSDD in order to interact with the touch control affordance.

Furthermore, in the illustrated example, the approach leverages the use of the camera that is already integral to the LFTSDD for purposes of video conferencing in order to recognize the location of the human subject for positioning of the touch control affordance. In other words, the integral camera advantageously plays the dual role of providing video imagery for video conferencing and imagery for determining dynamic positioning of the touch control affordance on the display screen of the LFTSDD. Moreover, computer analysis of such imagery to determine a location of a human subject can be performed in an efficient manner that does not require analysis of imagery from multiple cameras (i.e., stereo depth sensing) or a separate depth sensing camera. Such functionality provides the technical effect of reducing consumption of computing resources.

Figure 2:
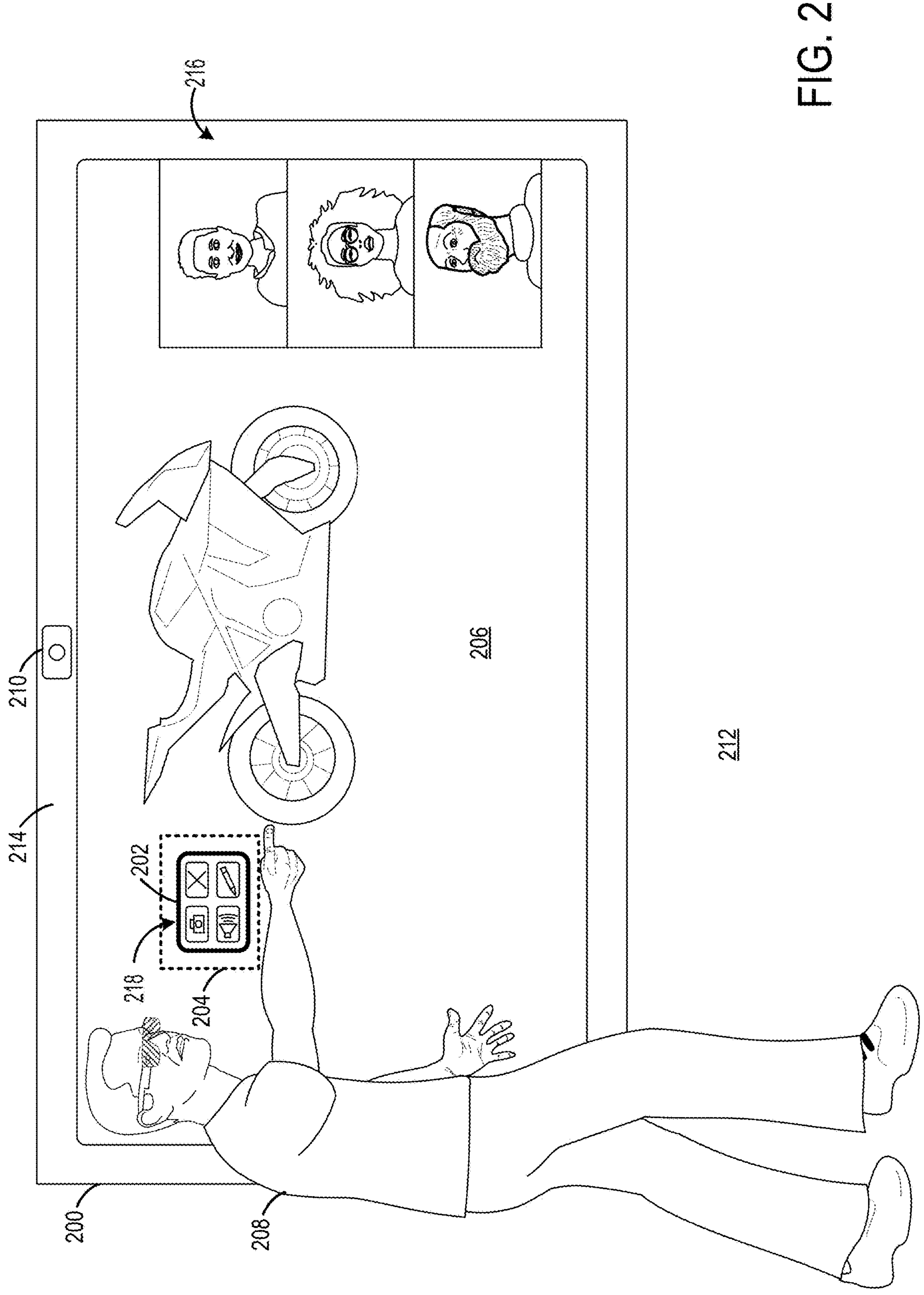
FIG. 2 shows an example LFTSDD configured to visually present a touch control affordance in a variable interaction zone of a display screen of the LFTSDD that changes based at least on a determined location of a human subject relative to the LFTSDD.

FIG. 2 shows an example LFTSDD 200 configured to visually present a touch control affordance 202 in a variable interaction zone 204 of a large-format display screen 206 of the LFTSDD 200 that changes position based at least on a recognized location of a human subject 208 relative to the LFTSDD 200. The LFTSDD 200 includes a camera 210. The camera 210 is configured to capture images of a scene 212 in front of the LFTSDD 200. In some examples, the camera 210 of the LFTSDD 200 can be integral to the LFTSDD 200. In the illustrated implementation, the camera 210 is positioned in a bezel 214 on top of the display screen 206 of the LFTSDD 200. In other examples, the camera 210 may be positioned in a different part of the LFTSDD 200, such as in the bezel 214 on a side of the display screen 206 or below the display screen 206. In still other examples, the camera 210 may be located behind the display screen 206. For example, the display screen 206 may be at least partially transparent or have a transparent region through which the camera 210 images the scene 212. The camera 210 may be located at any suitable position within the LFTSDD 200 to capture images of human subjects in the scene 212 in front of the LFTSDD 200. In some examples, the camera 210 may be peripheral to the LFTSDD 200 (e.g., connected to the LFTSDD 200 via a USB cable).

In some examples, the camera 210 is configured to capture video imagery that enables the LFTSDD 200 to have video conferencing functionality in which the human subject 208 can interact with a plurality or remote users 216. In some examples, the camera 210 may be a wide-angle visible-light camera that is configured to capture color (e.g., RGB) images of the scene 212. The wide-angle visible-light camera may have a wide-angle lens having a field of view that is suitably large enough to cover an entire area of the scene 212, such that human subjects residing at any location in the scene 212 can be imaged. Referring back to the example shown in FIG. 1A, the wide-angle visible-light camera may be configured to have a field of view that covers the conference room 104, so that the human subjects residing in any location in the conference room 104 can be imaged.

In other examples, the camera 210 may be a wide-angle infrared camera that is configured to capture infrared or near-infrared images of the scene 212. In some examples, the wide-angle infrared camera may be used to determine the variable interaction zone 204 of the display screen 206 based at least on a recognized location of the human subject 208 relative to the LFTSDD 200. In such examples, the wide-angle infrared camera would not be used to provide video conferencing functionality, and instead a separate visible-light camera of the LFTSDD 200 could be used to provide video conferencing functionality. In other examples, the LFTSDD 200 may lack video conferencing functionality.

In some examples, the LFTSDD 200 may include a plurality of cameras (a plurality of the same type of cameras or a plurality of different types of cameras) that are configured to capture images the scene 212. In some examples, the plurality of cameras may be used for human subject recognition. In some examples, different cameras may be positioned to capture images of different parts of the scene. In one example in which the LFTSDD has significant width one camera may be positioned to capture images of a right side of the scene and another camera may be positioned to capture images of a left side of the scene.

The LFTSDD 200 is configured to computer-analyze one or more images of the scene 212 received from the camera 210 to recognize human subjects in the scene 212, such as the human subject 208. The LFTSDD 200 is further configured to determine a location of each recognized human subject relative to the LFTSDD 200. In the case of the recognized human subject 208, the LFTSDD 200 is configured to determine the variable interaction zone 204 of the display screen 206 based at least on the recognized location of the human subject 208.

The variable interaction zone 204 defines an area of the display screen 206 where the touch control affordance 202 is visually presented. The variable interaction zone 204 is smaller than an entirety of the display screen 206. The variable interaction zone 204 is positioned a designated distance in front of the human subject 208 on the display screen 206 based at least on the recognized location of the human subject 208 relative to the LFTSDD 200. Specifically, the variable interaction zone 204 is positioned so that the human subject 208 can comfortably provide touch input to interact with the touch control affordance 202 from the recognized location in the scene 212. As the human subject 208 moves around the scene 212 in front of the LFTSDD 200, the location of the human subject 208 is tracked, so that the variable interaction zone 204 and correspondingly the touch control affordance 202 is actively moved on the display screen 206 to remain in front of the human subject 208. In this way, the human subject 208 can provide touch input to the touch control affordance 202 from whichever location the human subject 208 is currently residing. Such customization of interactive control of the LFTSDD 200 improves efficiency of user movement relative to a LFTSDD that visually presents a touch control affordance in a fixed position.

In the illustrated implementation, the touch control affordance 202 includes a plurality of virtual buttons 218 that control various functionality of the LFTSDD 200. For example, the different virtual buttons may be configured to manage various application program windows (e.g., opening, closing, re-sizing, and/or positioning of such application program windows); annotate content; capture screen shots; and/or adjust audio settings of the LFTSDD 200.

The touch control affordance 202 may include any suitable virtual buttons to allow a user to control any suitable functionality of the LFTSDD 200. In other examples, the touch control affordance may take another visual form, such as a banner, a dial, or a drop-down menu. The variable interaction zone 204 may be sized to accommodate any suitable touch control affordance. Note that the variable interaction zone 204 is not actually visible to the human subject 208 but is merely an internal designation made by the LFTSDD 200.

Figure 3:
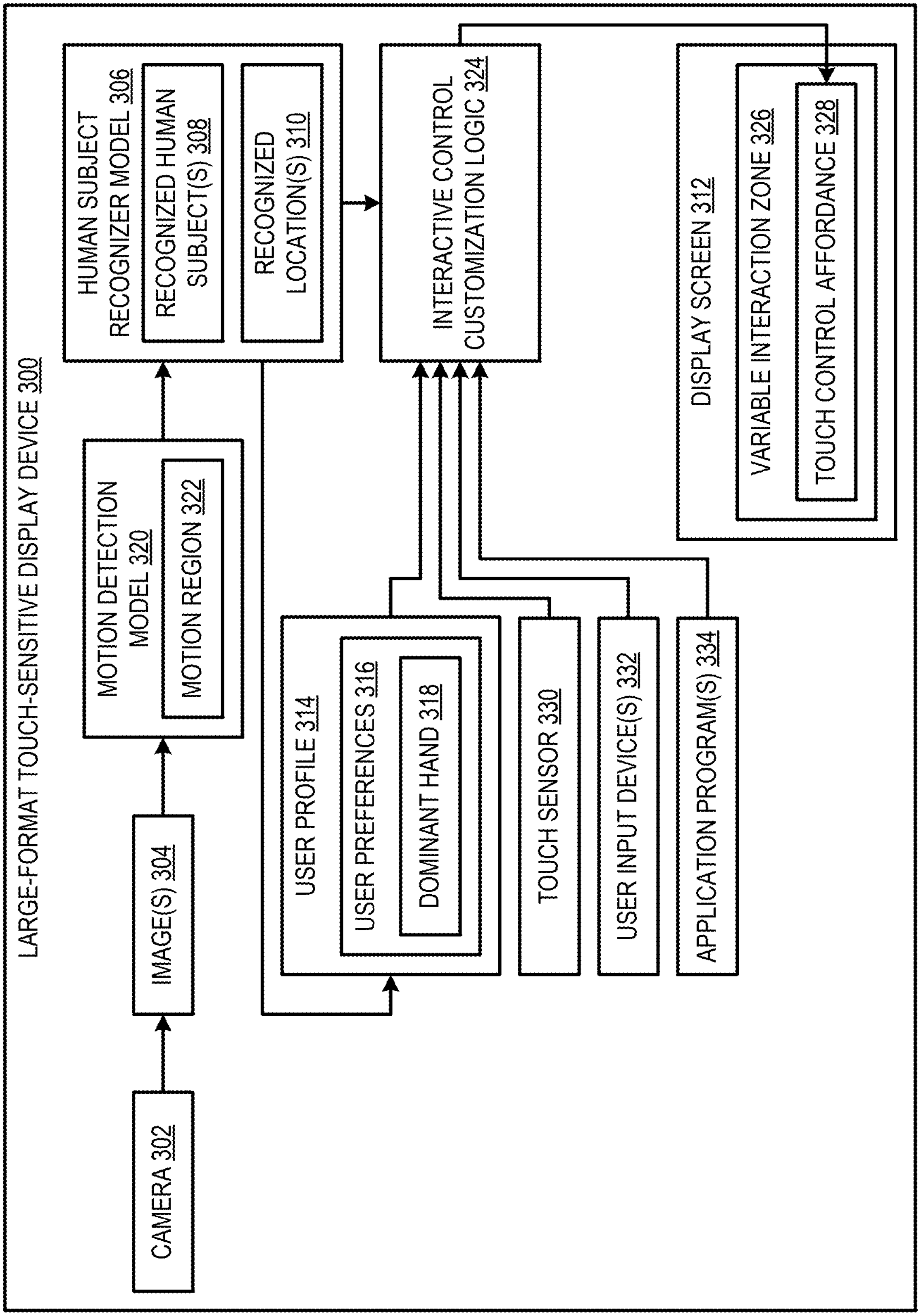
FIG. 3 shows a block diagram of an example LFTSDD.

FIG. 3 shows a block diagram of an example LFTSDD 300. For example, the LFTSDD 300 may correspond to the LFTSDD 200 shown in FIG. 2. The LFTSDD 300 includes a camera 302 that is configured to capture one or more images 304 of a scene in front of the LFTSDD 300. The LFTSDD 300 includes a human subject recognizer model 306 that is configured to receive the image(s) from the camera 302 and computer-analyze the image(s) 304 to recognize a human subject 308 in the scene and a location 310 of the human subject 308 relative to the LFTSDD 300. In some examples, the human subject recognizer model 306 is a machine-learning model previously-trained to recognize the presence of a human subject within an image. In some examples, the machine learning model is a neural network previously-trained with training data including a plurality of ground-truth labeled images of human subjects captured by a training-compatible camera relative to the camera 302 of the LFTSDD 300. Such ground-truth labeled images may provide the technical effect of efficiently training the human subject recognizer model via supervised learning to more accurately recognize human subjects in a setting in which a LFTSDD is implemented with a training-compatible camera relative to unsupervised training. In some examples, the training-compatible camera may be the same exact type as the camera 302. In some examples, the training-compatible camera may have the same resolution as the camera 302. In some examples, the ground-truth labeled images may be captured using the same operating mode (e.g., infrared images or RGB images) as the camera 302.

The human subject recognizer model 306 may be configured to determine the location 310 of the human subject 308 relative to the LFTSDD 300 in any suitable manner. For example, the human subject recognizer model 306 may be configured to map a world space location of the human subject 308 in the scene to a screen space location on a display screen 312 of the LFTSDD 300. In some examples, the recognized location 310 of the human subject 308 may correspond to a particular body part of the human subject 308. For example, the recognized location 310 may correspond to the human subject's head, arm, torso, or another body part. In some examples, the human subject recognizer model 306 may be configured to perform skeletal tracking of the human subject 308 by computer analyzing the image(s) 304 to perform 2D pose estimation and 3D model fitting in order to recognize the different boy parts of the human subject 308.

The human subject recognizer model 306 may be configured to determine a direction in which a recognized human subject is facing relative to the LFTSDD 300 in order to accurately position the touch control affordance 328 in front of the human subject. Without determining the direction that the human subject 308 is facing, the touch control affordance 328 could be visually presented on the display screen 312 behind the human subject, such that the human subject 308 could not even see the touch control affordance 328 on the display screen 312 because they would be facing away from it.

In some implementations, the human subject recognizer model 306 may be configured to recognize and distinguish a plurality of different human subjects in the scene in front of the LFTSDD 300 and recognize a location of each of the plurality of human subjects relative to the LFTSDD 300 based at least on computer analysis of the image(s) 304.

In some implementations, the human subject recognizer model 306 may be configured to identify a human subject and associate the recognized human subject 308 with a user profile 314. The user profile 314 may include various information about the human subject 308. In some examples, the user profile 314 may include user preferences 316 of the human subject 308 when interacting with the LFTSDD 300. In some examples, the user preferences 316 may be automatically determined based at least on tracking previous behavior of the human subject 308 when interacting with the LFTSDD 300. In some examples, the human subject recognizer model 306 may be configured to identify a dominant hand 318 of the human subject 308 based at least on tracking previous interactions of the human subject 308 with the LFTSDD 300. Such user preferences 316 may be used to position a touch control affordance on the display screen 312 while the human subject is interacting with the LFTSDD 300.

In some implementations, at least some of the user preferences 316 may be manually indicated by the human subject 308. For example, the human subject 308 may answer a series of questions that populate the user profile 314 with the user preferences 316.

In some implementations, the human subject recognizer model 306 may be configured to recognize the human subject(s) 308 based at least on the location of the human subject(s) being within a threshold distance of the LFTSDD 300 in the scene.

Figure 4:
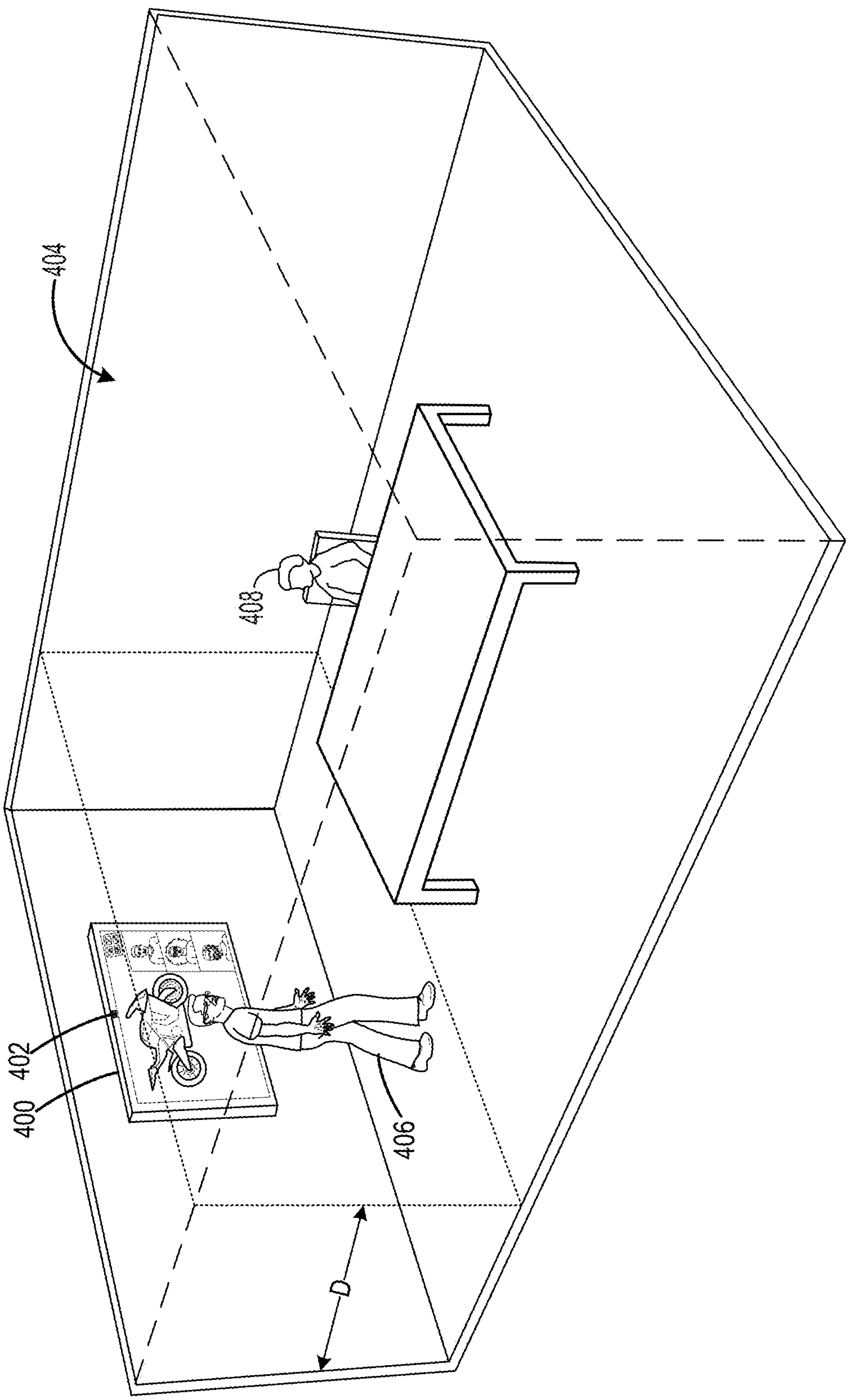
FIG. 4 shows an example LFTSDD deployed in a conference room setting.

In one example shown in FIG. 4, a LFTSDD 400 includes a camera 402 configured to image a conference room 404. For example, the LFTSDD 400 corresponds to the LFTSDD 300 shown in FIG. 3. The LFTSDD 400 is configured to recognize any human subjects within a threshold distance D of the LFTSDD 400. Any human subjects determined to be beyond the threshold distance D may be disregarded by the LFTSDD 400 for purposes of tracking and customizing interaction with the LFTSDD 400. The threshold distance D may be set to any suitable distance. As one example, the threshold distance may be set to within in 5 feet of the LFTSDD 400 or a similar distance in which a human subject can provide touch input to the LFTSDD 400. In the illustrated example, the LFTSDD 400 recognizes a first human subject 406 that is within the threshold distance D of the LFTSDD 400 and disregards a second human subject 408 that is positioned beyond the threshold distance D from the LFTSDD 400.

A distance between a human subject and the LFTSDD 300 can be determined in any suitable manner. In one example, the LFTSDD 300 determines a distance between a human subject and the LFTSDD 300 based at least on a relative size of a body part of the human subject, such as the human subject's head size. In this case, a human subject having a substantially larger head size in an image is determined to be closer to the LFTSDD 300 than a different human subject having a substantially smaller head size in the image. Specific determinations of distance may be calculated relative to an average adult human head size at a given distance, for example.

Using the threshold distance as a filter for human subject recognition provides the technical benefit of reducing false positive recognition of human subjects that are not interacting with the LFTSDD. Such a feature may be particularly applicable to scenarios where the scene is crowded with a large quantity of human subjects, such as a group of human subjects gathered around a conference table in a conference room. Such a feature may be broadly applicable to a variety of different scenarios in which multiple human subjects reside in a scene.

Returning to FIG. 3, in some implementations, the LFTSDD 300 optionally may include a motion detection model 320 that is configured to computer analyze the image(s) 304 to identify an above-threshold motion in the scene. For example, the motion detection model 320 may be configured to perform a comparison of different images acquired at different times (e.g., a sequence of images) to identify an above-threshold motion. In some implementations, the threshold for identifying motion may correspond to a number of pixels changing from image to image. For example, above threshold motion may be triggered if contiguous pixels occupying at least 3% of a field of view change by more than 5% from image to image. However, this is just an example, and other parameters/thresholds may be used. In some examples, above-threshold motion may correspond to a human subject entering or moving in a field of view of the camera 302.

In response to identifying the above-threshold motion, the motion detection model 320 may be configured to identify a motion region 322 in the image(s) 304 where the above threshold motion occurs. In such implementations, the human subject recognizer model 306 may be configured to computer-analyze the motion region 322 in the image(s) 304 to recognize the human subject 308 in the scene and the location 310 of the human subject 308 relative to the LFTSDD 300.

Use of the motion detection model 320 that identifies the above-threshold motion provides the technical effect of reducing memory consumption and processor utilization of the LFTSDD 300. In particular, motion detection analysis may be less resource intensive than human subject recognition analysis. So, by initially performing motion detection analysis on the image(s) 304, and then performing human subject recognition analysis only on motion regions 3322 of those images that are identified as having above-threshold motion, memory usage and processor utilization may be reduced relative to an approach in which human subject recognition analysis is performed on an entirety of every image. Although, in some implementations, the LFTSDD 300 may be configured to perform human subject recognition analysis on the image(s) 304 without performing motion detection.

The human subject recognizer model 306 and/or the motion detection model 320 may employ any suitable combination of state-of-the-art and/or future machine learning (ML) and/or artificial intelligence (AI) techniques.

The LFTSDD 300 includes interactive control customization logic 324 that is configured to determine a variable interaction zone 336 of the display screen 312 of the LFTSDD 300 based at least on the recognized location 310 of the human subject 308 relative to the LFTSDD 300. The variable interaction zone 326 defines an area of the display screen 312 where a touch control affordance 328 is visually presented. For example, the variable interaction zone 326 may correspond to the variable interaction zone 204 shown in FIG. 2.

The variable interaction zone 326 may be sized to accommodate any suitable sized touch control affordance. The variable interaction zone 326 is positioned a designated distance in front of the human subject 308 on the display screen 312 based at least on the recognized location 310 of the human subject 308 relative to the LFTSDD 300. The designated distance may be any suitable distance to allow for the human subject 308 to view and comfortably interact with the touch control affordance 328. The designated distance may be determined in any suitable manner. In some examples, the designated distance is determined based on an average body part size (e.g., hand size, arm length) of a population of human subjects.

In some examples, the designated distance of the variable interaction zone 326 may be dynamically adapted based on the user preferences 316. For example, user interactions with the LFTSDD 300 may be tracked over time and the user's preferences for the position of the variable interaction zone 326/touch control affordance 328 may be learned through observation of such interactions. In one example, a human subject may manually move the touch control affordance 328 to a higher position on the display screen 312 when the human subject moves closer to the LFTSDD and moves the touch control affordance 328 to a lower position of the display screen 312 when the human subject moves further away from the LFTSDD. Such interactions may be observed and learned, such that the interactive control customization logic 324 is configured to dynamically adapt the designated distance when the touch control affordance 328 is visually presented on the display screen 312.

The variable interaction zone 326 may be positioned in relation to the recognized location 310 of the recognized human subject 308 in any suitable manner. In some examples, the variable interaction zone 326 may be positioned in relation to a body part (e.g., a recognized head position or a recognized hand position) of the recognized human subject 308. The interactive control customization logic 324 is configured to visually present the touch control affordance 328 in the variable interaction zone 326 of the display screen 312, so that the human subject 308 can provide touch input to interact with the touch control affordance 328 from the recognized location 310.

The interactive control customization logic 324 may be configured to visually present the touch control affordance 328 in the variable interaction zone 326 based at least on any suitable operating conditions of the LFTSDD 300. In some examples, the interactive control customization logic 324 may be configured to visually present the touch control affordance 328 in the variable interaction zone 326 based at least on detecting touch input via a touch sensor 330 of the LFTSDD 300.

Figure 5:
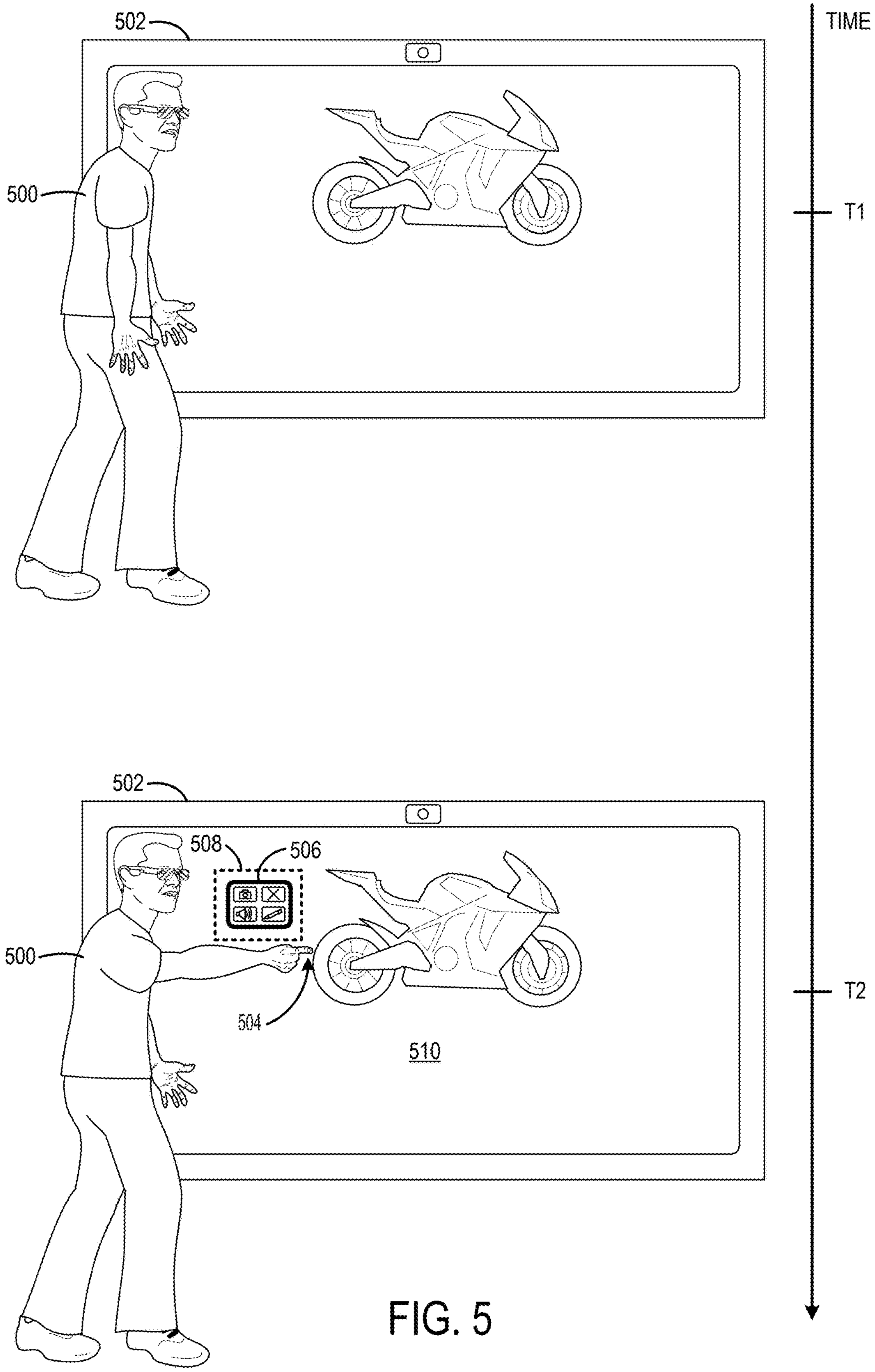
FIG. 5 shows an example scenario in which an LFTSDD visually presents a touch control affordance based at least on detecting touch input to the LFTSDD.

In one example shown in FIG. 5, at time T1, a human subject 500 is not providing any touch input to a LFTSDD 502, and the LFTSDD 502 is not visually presenting a touch control affordance on a display screen 510 of the LFTSDD 502. Note that the LFTSDD 502 is representative of the LFTSDD 300 shown in FIG. 3. Subsequently, at time T2, the human subject 500 provides touch input 504 to the LFTSDD 502. A touch sensor (e.g., the touch sensor 330 shown in FIG. 3) of the LFTSDD 502 detects the touch input 504, and the LFTSDD 502 visual presents a touch control affordance 506 in a variable interaction zone 508 of the display screen 510 of the LFTSDD 502 based at least on detecting the touch input 504.

In some examples, the LFTSDD 502 may be configured to visually present the touch control affordance 506 only while the human subject 500 is providing the touch input 504. For example, once the human subject lifts their finger from the display screen, the LFTSDD 502 may cease visually presenting the touch control affordance 506.

In other examples, the LFTSDD 502 may be configured to visually present the touch control affordance 506 via a toggle operation. For example, the LFTSDD 502 may be configured to visually present the touch control affordance 506 based at least on the human subject 500 providing a single tap on a display screen of the LFTSDD 502, and the LFTSDD 502 may cease visually presenting the touch control affordance 506 based at least on the human subject 500 providing a subsequent single tap on the display screen outside of the touch control affordance 506.

In still other examples, the LFTSDD 502 may be configured to visually present the touch control affordance 506 for a designated duration once the touch input 504 is detected via the touch sensor. For example, the LFTSDD 502 may be configured to visually present the touch control affordance 506 for 30 seconds after the last touch input is detected. Once the 30 seconds has elapsed without detecting another touch input, the LFTSDD 502 may cease visually presenting the touch control affordance 506.

In some examples, the interactive control customization logic 324 may be configured to visually present the touch control affordance 328 in the variable interaction zone 326 based at least on detecting user input from one or more other user input devices 332 of the LFTSDD 300.

Figure 6:
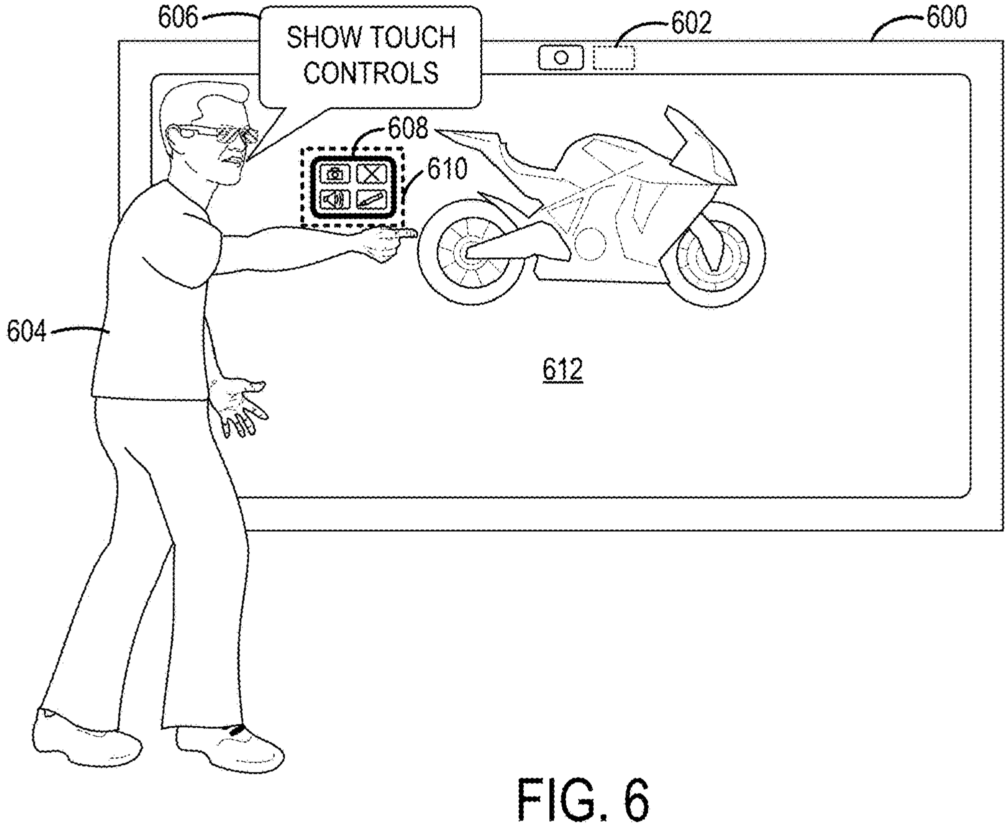
FIG. 6 an example scenario in which an LFTSDD visually presents a touch control affordance based at least on receiving a voice command.

In one example shown in FIG. 6, an LFTSDD 600 includes a microphone 602 that is configured to receive audio input from a human subject 604. Note that the LFTSDD 600 corresponds to the LFTSDD 300 shown in FIG. 3. The LFTSDD 600 is configured to receive a voice command 606 (i.e., "SHOW TOUCH CONTROLS") via the microphone 602 of the LFTSDD 600. The LFTSDD 600 is configured to visually present a touch control affordance 608 in a variable interaction zone 610 of a display screen 612 based at least on receiving the voice command 606.

In some examples, the LFTSDD 600 may be configured to visually present the touch control affordance 608 via a toggle operation based at least on receiving the voice command 606. For example, the human subject 604 may provide a different voice command (e.g., "HIDE TOUCH CONTROLS) to cause the LFTSDD 600 to cease visually presenting the touch control affordance 608. In other examples, the LFTSDD 600 may be configured to visually present the touch control affordance 608 for a designated duration once the voice command 606 is received via the microphone 602. The LFTSDD 600 may be configured to visually present the touch control affordance 608 based on receiving any suitable voice command via the microphone 602.

Figure 7:
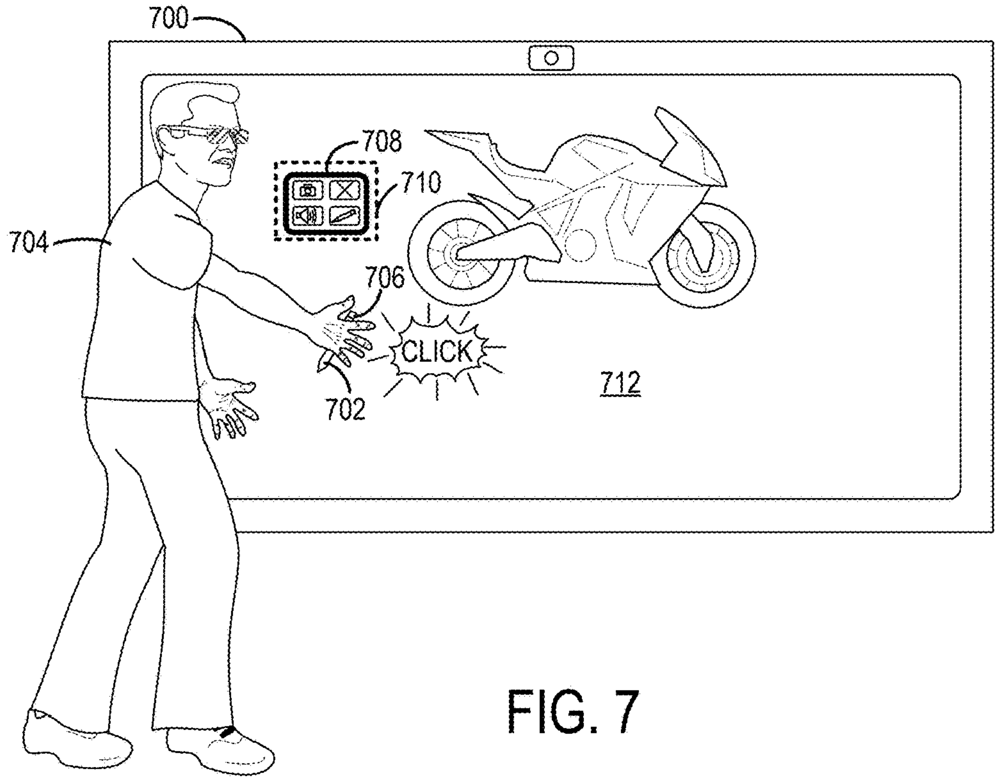
FIG. 7 shows an example scenario in which an LFTSDD visually presents a touch control affordance based at least on receiving a control signal from an active stylus communicatively coupled with the LFTSDD.

In another example shown in FIG. 7, an LFTSDD 700 is communicatively coupled with an active stylus 702 to enable a human subject 704 to provide touch input to the LFTSDD 700. Note that the LFTSDD 700 corresponds to the LFTSDD 300 shown in FIG. 3. The active stylus 702 includes a depressible button 706. The active stylus 702 is configured to send a control signal to the LFTSDD 700 based at least on the depressible button 706 being depressed by the human subject 704. The LFTSDD 700 is configured to visually present a touch control affordance 708 in a variable interaction zone 710 of a display screen 712 based at least on receiving the control signal from the active stylus 702.

In some examples, the LFTSDD 700 may be configured to visually present the touch control affordance 708 via a toggle operation in which the depressible button 706 is depressed once to visually present the touch control affordance 708 and the depressible button 706 is depressed a second time to cease visual presentation of the touch control affordance 708. In other examples, the LFTSDD 700 may be configured to visually present the touch control affordance 708 for a designated duration once the control signal is received via from the active stylus 702. The LFTSDD 700 may be configured to visually present the touch control affordance 708 based on receiving any suitable control signal from the active stylus 702, which may be generated based on any suitable interaction between the human subject 704 and the active stylus 702.

The functionality discussed in the above examples provides the technical effect of improving human-computer interaction by visually presenting a touch control affordance under conditions when the human subject expects the touch control affordance to be visually presented (e.g., responsive to specific user actions) as opposed to conditions where the touch control affordance may interfere with other user interactions.

Returning to FIG. 3, in some implementations, the interactive control customization logic 324 may be configured to position the touch control affordance in the variable interaction zone 326 based at least on user preferences 316 determined from the user profile 314 associated with the recognized human subject 308.

In some implementations, the user preferences 316 of the human subject 308 may indicate the dominant hand 318 of the human subject 308. In some examples, the dominant hand 318 of the human subject 308 may be determined implicitly by the human subject recognizer model 306 by observing interaction between the human subject and the LFTSDD 300 over time. In other examples, the human subject 308 may explicitly declare the dominant hand 318 in the user profile 314 via user input. The interactive customization control logic 324 may be configured to position the touch control affordance 328 in the variable interaction zone 326 based at least on a location of the dominant hand 318 of the human subject 308.

Figure 8:
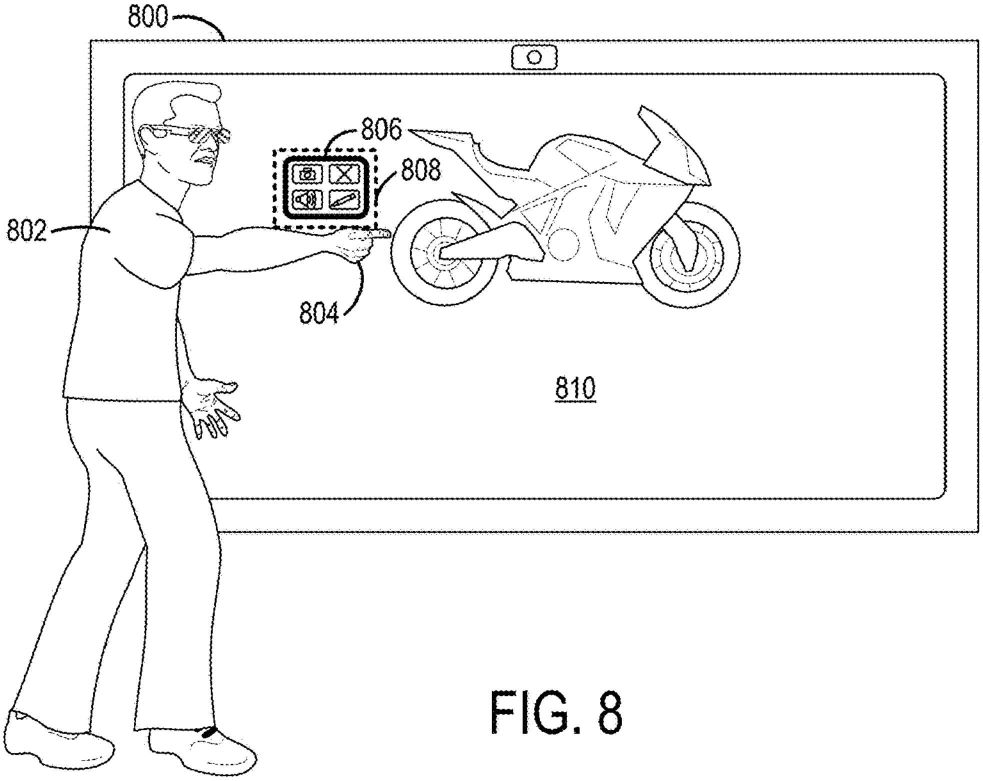
FIG. 8 shows an example scenario in which an LFTSDD visually presents a touch control affordance based at least on detecting touch input from a dominant right hand of a human subject.

In one example shown in FIG. 8, an LFTSDD 800 recognizes that a human subject 802 provides touch input to the LFTSDD 800 via a dominant right hand 804 that is recognized based on information stored in a user profile of the human subject 802. Note that the LFTSDD 800 corresponds to the LFTSDD 300 shown in FIG. 3. The LFTSDD 800 is configured to visually present a touch control affordance 806 in a variable interaction zone 808 of a display screen 810 of the LFTSDD 800 based at least on the location of the dominant right hand 804 relative to the LFTSDD 800. Additionally, the LFTSDD 800 recognizes the direction in which the human subject 802 is facing, so that the touch control affordance 806 is positioned in front of the human subject 802. In the illustrated example, the touch control affordance 806 is positioned in front of the human subject 802 to the right just above the dominant right hand 804 on the display screen 810. In some examples, the position of the touch control affordance 806 may be dynamically adapted from a default position based on the learned behavior of the human subject 802 over time.

Figure 9:
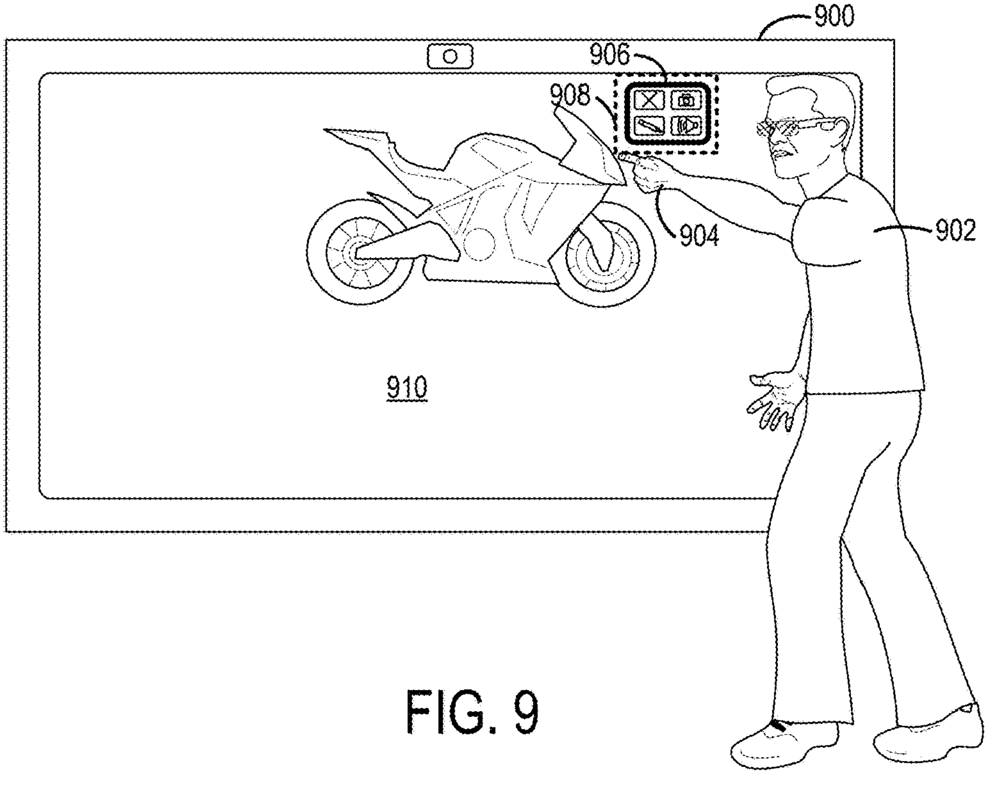
FIG. 9 shows an example scenario in which an LFTSDD visually presents a touch control affordance based at least on detecting touch input from a dominant left hand of a human subject.

In another example shown in FIG. 9, an LFTSDD 900 recognizes that a human subject 902 provides touch input to the LFTSDD 900 via a dominant left hand 904 that is recognized based on information stored in a user profile of the human subject 902. Note that the LFTSDD 900 corresponds to the LFTSDD 300 shown in FIG. 3. The LFTSDD 900 is configured to visually present a touch control affordance 906 in a variable interaction zone 908 of a display screen 910 of the LFTSDD 900 based at least on the location of the dominant left hand 904 relative to the LFTSDD 900. Additionally, the LFTSDD 900 recognizes the direction in which the human subject 902 is facing, so that the touch control affordance 906 is positioned in front of the human subject 902. In the illustrated example, the touch control affordance 906 is positioned in front of the human subject 902 to the left just above the dominant left hand 904 on the display screen 910. In some examples, the position of the touch control affordance 806 may be dynamically adapted from a default position based on the learned behavior of the human subject 802 over time.

Detecting a human subject's dominant hand and positioning the touch control affordance based on the location of the dominant hand provides the technical benefit of tailoring content to meet expectations and preferences of the human subject while interacting with the LFTSDD to facilitate efficient and accurate touch input by the human subject.

Figure 10:
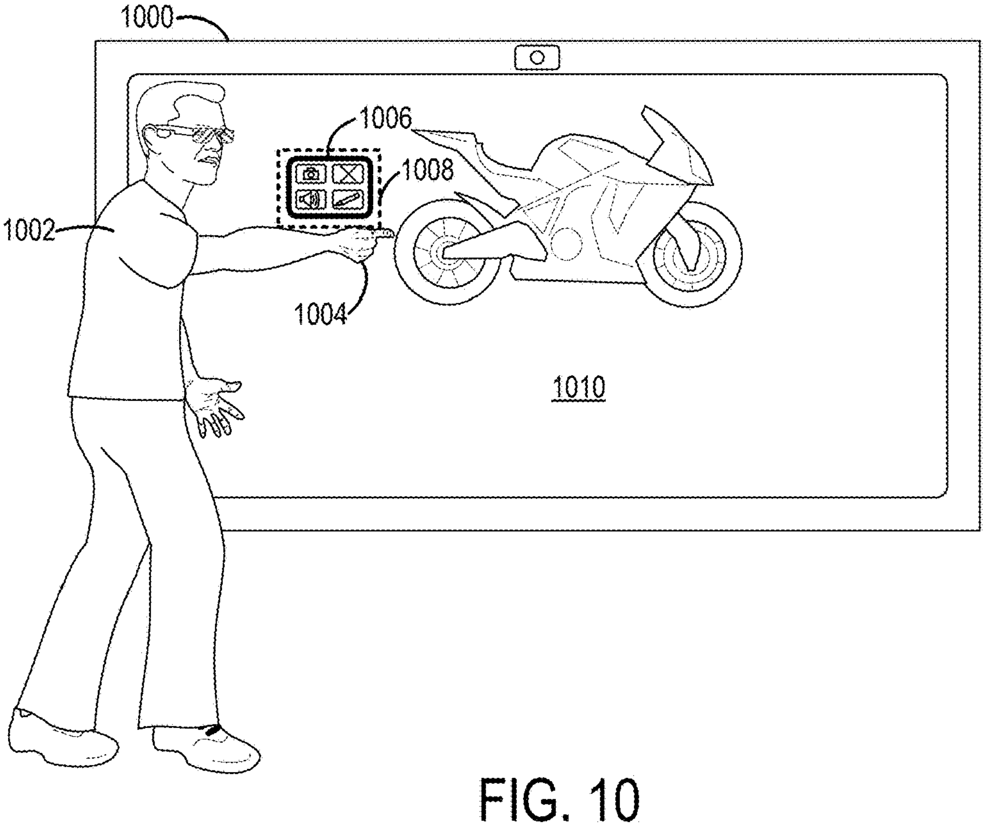
FIG. 10 shows an example scenario in which an LFTSDD visually presents a touch control affordance positioned above a human subject's hand that is providing touch input to the LFTSDD.

In some implementations, the user preferences 316 of the human subject 308 may indicate placement of the touch control affordance relative to a position of a human subject's hand or another body part. In one example shown in FIG. 10, an LFTSDD 1000 recognizes that a human subject 1002 provides touch input to the LFTSDD 1000 via a right hand 1004. Note that the LFTSDD 1000 corresponds to the LFTSDD 300 shown in FIG. 3. The LFTSDD 1000 is configured to visually present a touch control affordance 1006 in a variable interaction zone 1008 of a display screen 1010 of the LFTSDD 1000 based at least on user preferences of the human subject 1002. In particular, a user profile of the human subject 1002 indicates that the human subject 1002 prefers the touch control affordance 1006 to be positioned above the human subject's hand 1004 on the display screen 1010, so that the human subject 1002 can comfortably interact with the touch control affordance 1006.

Figure 11:
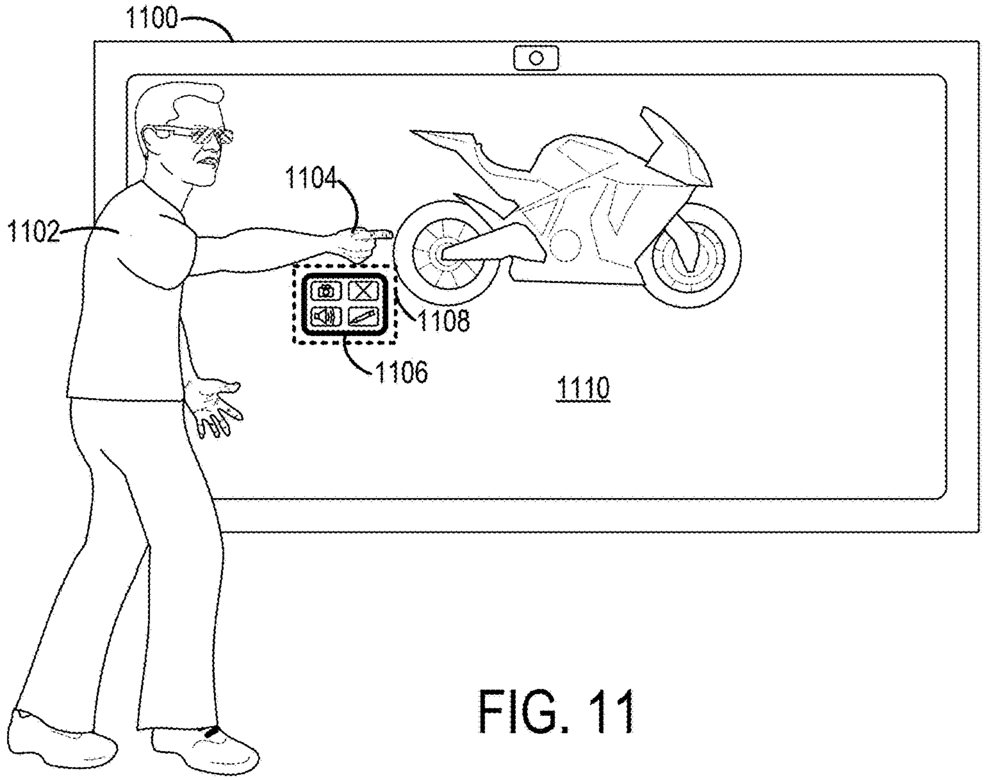
FIG. 11 shows an example scenario in which an LFTSDD visually presents a touch control affordance positioned belove a human subject's hand that is providing touch input to the LFTSDD.

In another example shown in FIG. 11, an LFTSDD 1100 recognizes that a human subject 1102 provides touch input to the LFTSDD 1100 via a right hand 1104. Note that the LFTSDD 1100 corresponds to the LFTSDD 300 shown in FIG. 3. The LFTSDD 1100 is configured to visually present a touch control affordance 1106 in a variable interaction zone 1108 of a display screen 1110 of the LFTSDD 1100 based at least on user preferences of the human subject 1102. In particular, a user profile of the human subject 1102 indicates that the human subject 1102 prefers the touch control affordance 1106 to be positioned below the human subject's hand 1104 on the display screen 1110, so that the human subject 1102 can comfortably interact with the touch control affordance 1106.

In some examples, the LFTSDD may be configured to implicitly determine the user preference for the placement of the touch control affordance through observation and tracking of interaction between the human subject and the LFTSDD over time. In other examples, the user preference for the placement of the touch control affordance may be determined explicitly by the human subject via user input to the user profile.

Detecting a human subject's personal preferences for positioning the touch control affordance provides the technical benefit of tailoring content to meet expectations of the human subject while interacting with the LFTSDD to facilitate efficient and accurate touch input by the human subject.

Returning to FIG. 3, in some implementations, the LFTSDD 300 may be configured to execute one or more application programs 334. The LFTSDD 300 may be configured to detect touch input to the LFTSDD 300 via the touch sensor 330 and the interactive control customization logic 324 may be configured to associate the touch input with an application program 334 executed by the LFTSDD 300. Further, the interactive control customization logic 324 may be configured to visually present an application-specific touch control affordance configured to control operation of the application program 334. For example, an application-specific touch control affordance may include various buttons that provide functionality that is specific to the context of the particular application program. Different application programs may have different application-specific touch control affordances that provide different functionalities.

Figure 12:
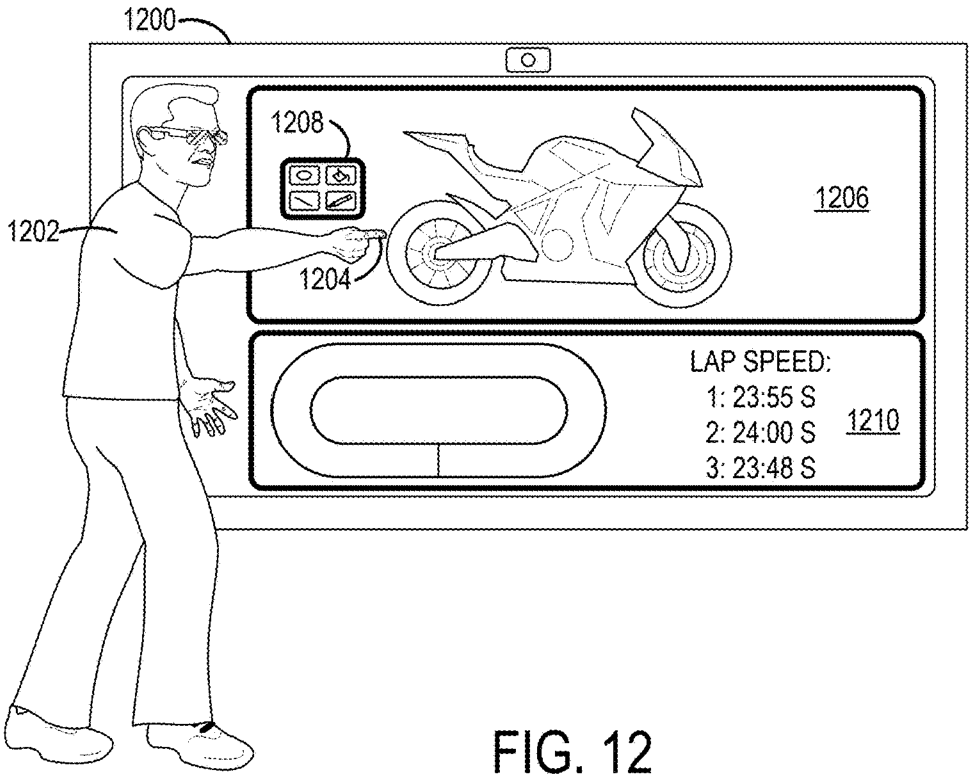
FIG. 12 shows an example scenario in which an LFTSDD visually presents an application-specific touch control affordance.

In an example shown in FIG. 12, an LFTSDD 1200 recognizes that a human subject 1202 provides touch input 1204 that is located within a first window 1206 of a first application program. Note that the LFTSDD 1200 corresponds to the LFTSDD 300 shown in FIG. 3. The LFTSDD 1200 is configured to visually present an application-specific touch control affordance 1208 that is associated with the first application program. The application-specific touch control affordance 1208 provides functionality that is specific to the first application program. In the illustrated example, the first application program is a computer-aided design (CAD)

program, so the application-specific touch control affordance may include buttons for controlling the CAP program, such as drawing and editing tools. The LFTSDD 1200 is configured such that if the human subject 1202 were to provide touch input to a second window 1210 of a second application program, then the LFTSDD 1200 would visually present a different application-specific touch control affordance that is associated with the second application program and provides functionality that is specific to that application program.

Visually presenting application-specific touch control affordances based at least on detecting touch input to an application window provides the technical benefit of tailoring content to improve accuracy and precision of control of the application program via touch input.

Returning to FIG. 3, in some implementations, the LFTSDD 300 may be configured to visually present an operating-system-level touch control affordance when a human subject provides touch input that is in an area of the display screen 312 that is not within a window of any particular application program. The operating-system-level touch control affordance may provide more general functionality for controlling operation of the LFTSDD 300 that is not specific to any particular application program. For example, the operating-system-level touch control affordance may provide tools to manage windows that are displayed on the display screen 312, such as open, close, move, and re-size tools.

In some implementations, the LFTSDD 300 may be configured to recognize multi-user scenarios and control presentation of the touch control affordance between different users based on touch input provided by the different users. In particular, the human subject recognizer model 306 may be configured to computer-analyze the image(s) 304 to recognize a plurality of human subjects 308 and a location 310 of each of the plurality of human subjects relative to the LFTSDD 300. Further, the interactive control customization logic 324 may be configured to associate touch input detected by the touch sensor 330 with a human subject of the plurality of human subjects. The interactive control customization logic 324 may be configured to position the variable interaction zone 326 on the display screen 312 a designated distance in front of the human subject associated with the touch input based at least on the recognized location 310 of the human subject 308 relative to the LFTSDD 300.

Figure 13:
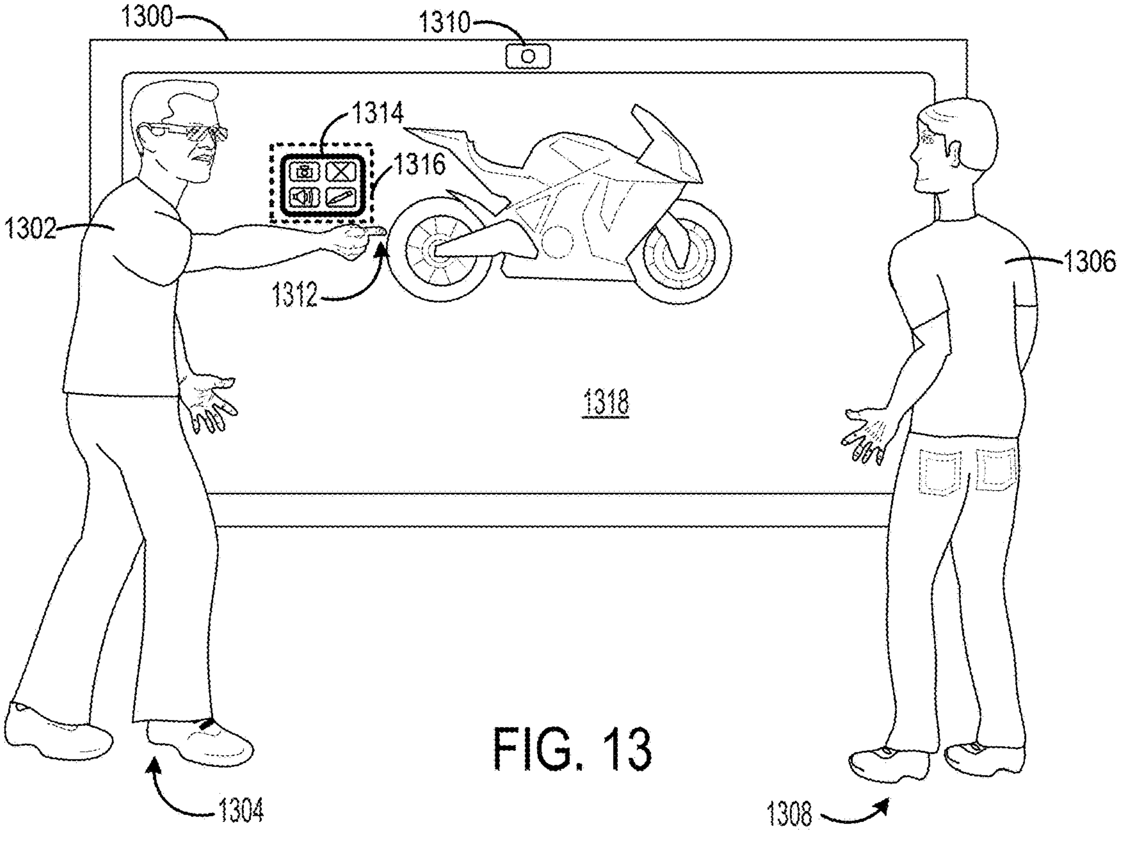
FIG. 13 shows an example scenario in which multiple human subjects are interacting with an LFTSDD.

In one example shown in FIG. 13, an LFTSDD 1300 recognizes a first human subject 1302 at a first location 1304 and a second human subject 1306 at a second location 1308 based on computer analyzing images captured by a camera 1310 of the LFTSDD 1300. Note that the LFTSDD 1200 corresponds to the LFTSDD 300 shown in FIG. 3. The LFTSDD 1300 detects touch input 1312 and associates the touch input 1312 with the first human subject 1302. The LFTSDD 1300 visually presents a touch control affordance 1314 in a variable interaction zone 1316 that is positioned on a display screen 1318 of the LFTSDD 1300 a designated distance in front of the first human subject 1302 associated with the touch input 1312.

In some examples, the LFTSDD 1300 may be configured to move the touch control affordance 1314 in front of the second human subject 1306 based on receiving touch input from the second human subject 1306. In other examples, the LFTSDD 1300 may be configured to visually present a second touch control affordance on the display screen 1318 based on receiving touch input from the second human subject 1306. In some examples, the LFTSDD 1300 may be configured to visually present user-specific touch control affordances having different functionality for different human subjects. In some examples, a user-specific touch control affordance may be customized for a particular human subject based on information in a user profile of the human subject.

The functionality discussed in the above examples provides the technical effect of improving human-computer interaction by visually presenting the touch control affordance at a position on the display screen that is intuitive for the human subject to interact with based on the current operating conditions and/or preferences of the human subject.

Figure 14:
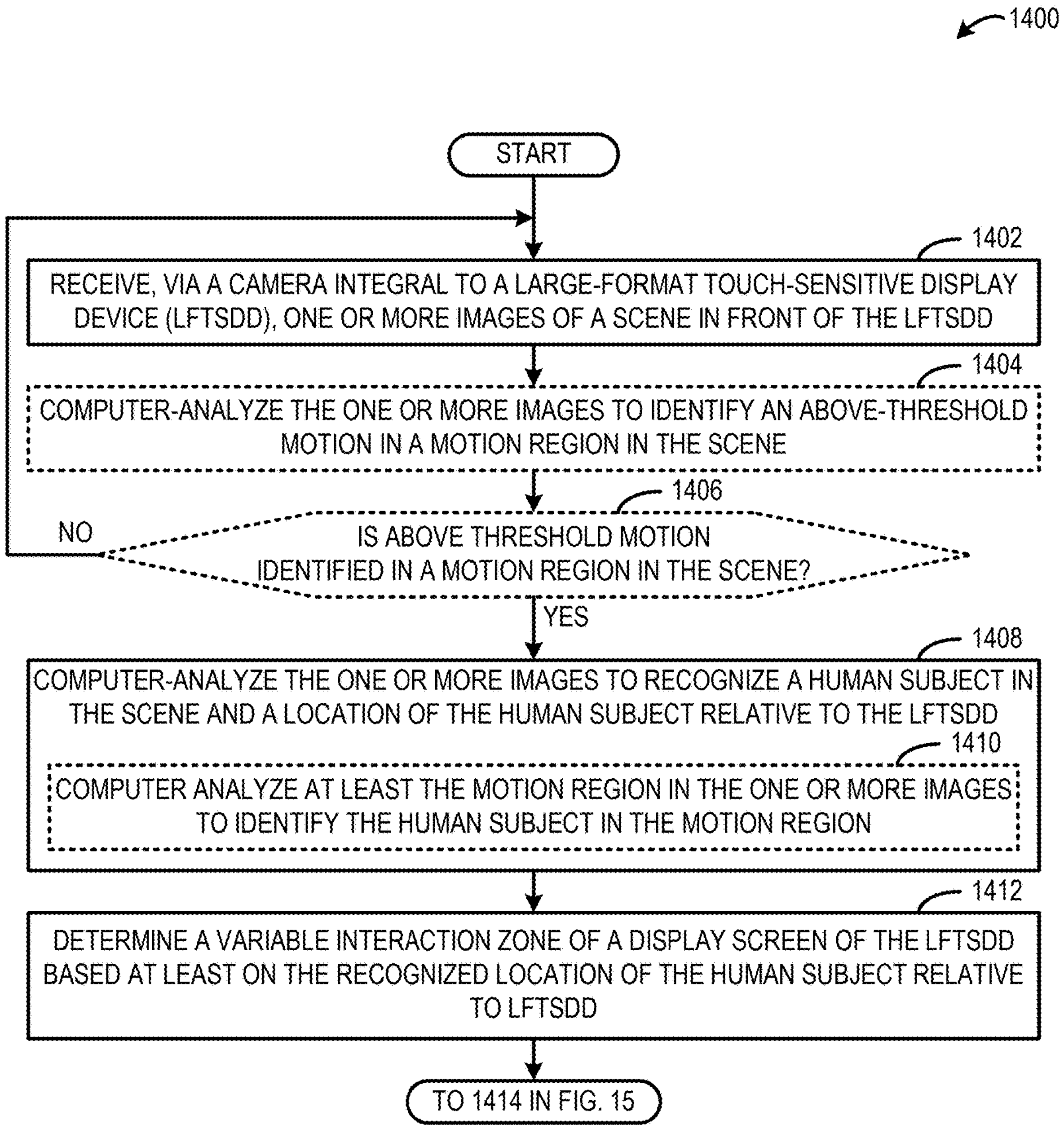
FIGS. 14-15 shows an example method for customizing interactive control of a LFTSDD.
Figure 15:
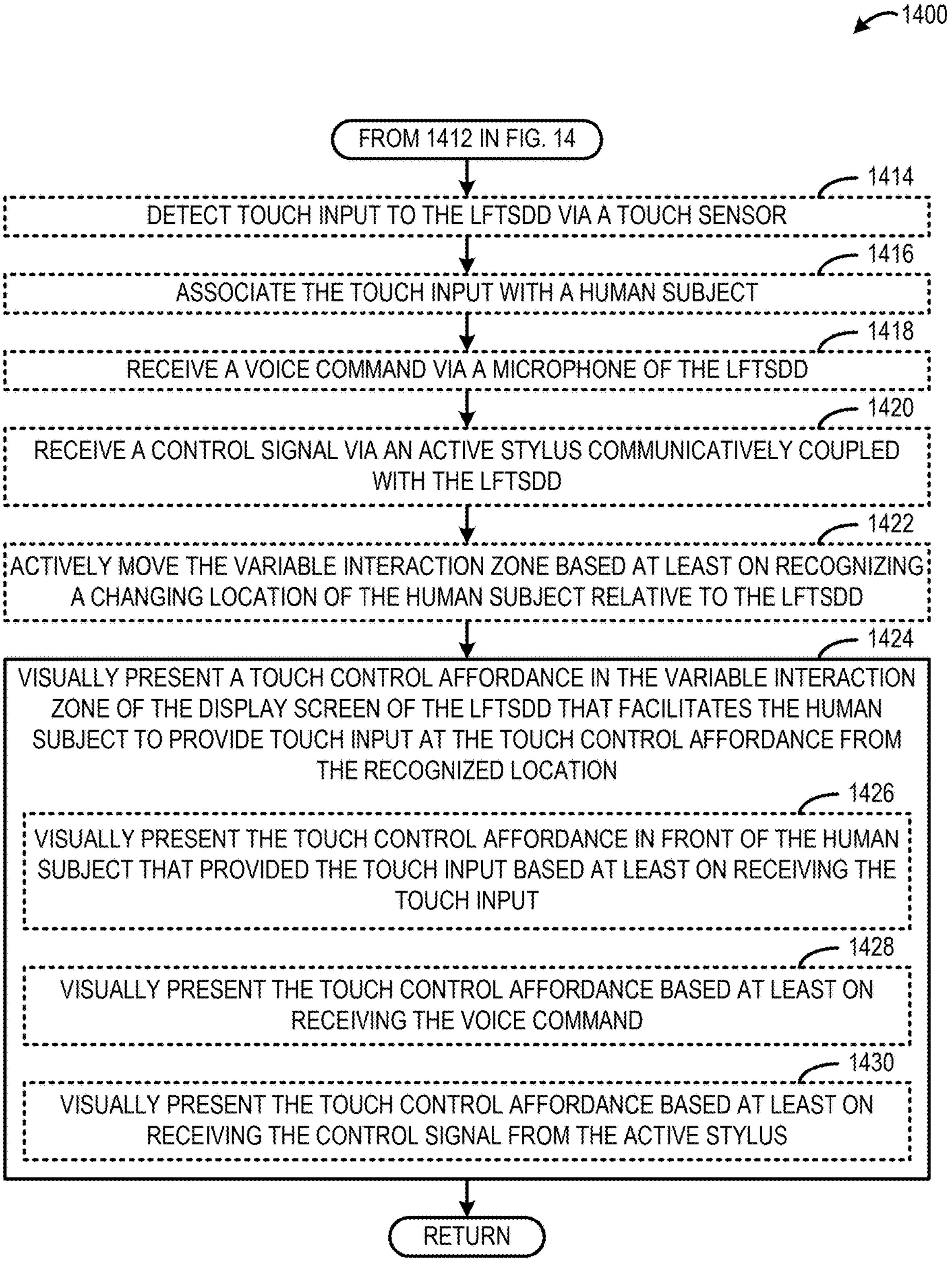

FIGS. 14-15 show an example method 1400 for customizing interactive control of a LFTSDD. For example, the method 1400 may be performed by the LFTSDD 300 shown in FIG. 3 In FIG. 14, at 1402 the method 1400 includes receiving, via a camera of the LFTSDD, one or more images of a scene in front of the LFTSDD. In one example, the camera is a wide-angle visible-light camera. In another example, the camera is a wide-angle infrared camera.

In some implementations, at 1404, the method 1400 may include computer-analyzing the one or more images to identify an above-threshold motion in a motion region in the scene. At 1406, if an above threshold motion in a motion region in the scene is identified, the method moves to 1408. Otherwise, the method 1400 returns to 1402 and additional images are captured via the camera for further computer analysis.

At 1408, the method 1400 includes computer-analyzing the one or more images to recognize a human subject in the scene and a location of the human subject relative to the LFTSDD. In implementations where an above threshold motion in a motion region is identified, at 1410, the method 1400 may include computer-analyzing at least the motion region in the one or more images to identify the human subject in the motion region.

At 1412, the method 1400 includes determining a variable interaction zone of a display screen of the LFTSDD based at least on the recognized location of the human subject relative to the LFTSDD. The variable interaction zone is smaller than the display screen. The variable interaction zone is positioned a designated distance in front of the human subject on the display screen based at least on the recognized location of the human subject relative to the LFTSDD.

Moving to FIG. 15, in some implementations, at 1414, the method 1400 may include detecting touch input to the LFTSDD via a touch sensor of the LFTSDD. At 1416, the method 1400 may include associating the touch input with a human subject. For example, the touch input may be associated with a human subject based on computer analysis of the images captured by the camera of the LFTSDD.

In some implementations, at 1418, the method 1400 may include receiving a voice command via a microphone of the LFTSDD.

In some implementations, at 1420, the method 1400 may include receiving, a control signal via an active stylus communicatively coupled with the LFTSDD.

In some implementations, at 1422, the method 1400 may include actively moving the variable interaction zone based at least on recognizing a changing location of the human subject relative to the LFTSDD.

At 1424 the method 1400 includes visually presenting a touch control affordance in the variable interaction zone of the display screen of the LFTSDD, so that the human subject can provide touch input to interact with the touch control affordance from the recognized location.

In some implementations where touch input is detected and associated with a human subject, at 1426, the method 1400 may include visually presenting the touch control affordance in front of the human subject that provided the touch input based at least on receiving the touch input.

In some implementations where the voice command is received via the microphone of the LFTSDD, at 1428, the method 1400 may include visually presenting the touch control affordance based at least on receiving the voice command.

In some implementations where the control signal is received via the active stylus, at 1430, the method 1400 may include visually presenting the touch control affordance based at least on receiving the control signal from the active stylus.

The method may be performed to customize interactive control of a LFTSDD by visually presenting a touch control affordance in a variable interaction zone that is positioned a designated distance in front of a human subject on a display screen of the LFTSDD, so that the human subject can provide touch input to interact with the touch control affordance without having to move from a location in which the human subject resides. Further, the variable interaction zone is actively moved based at least on recognizing a changing location of the human subject relative to the LFTSDD, so that the position of the touch control affordance varies as the location of the human subject varies. In this way, the touch control affordance remains conveniently accessible to the human subject. Such variable positioning of the touch control affordance provides the technical effect of reducing a burden of a human subject to provide user input to a computing device, because the human subject is not required to walk back and forth across the LFTSDD in order to interact with the touch control affordance.

In some implementations, the methods and processes described herein may be tied to a computing system of one or more computing devices. In particular, such methods and processes may be implemented as computer hardware, a computer-application program or service, an application-programming interface (API), a library, and/or other computer-program product.

Figure 16:
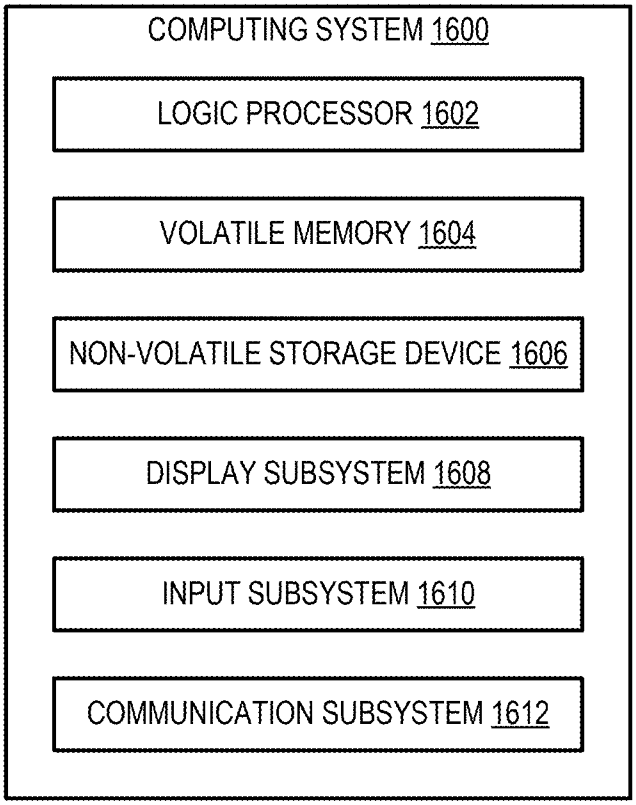
FIG. 16 shows an example computing system.

FIG. 16 schematically shows a non-limiting implementation of a computing system 1600 that can enact one or more of the methods and processes described above. Computing system 1600 is shown in simplified form. Computing system 1600 may embody the LFTSDD 200 shown in FIG. 2, the LFTSDD 300 shown in FIG. 3 or any other LFTSDD described herein. Computing system 1600 may take the form of one or more display devices, personal computers, server computers, tablet computers, home-entertainment computers, network computing devices, gaming devices, mobile computing devices, mobile communication devices (e.g., smart phone), and/or other computing devices, and wearable computing devices such as head-mounted, near-eye augmented/mixed/virtual reality devices.

Computing system 1600 includes a logic processor 1602, volatile memory 1604, and a non-volatile storage device 1606. Computing system 1600 may optionally include a display subsystem 1608, input subsystem 1610, communication subsystem 1612, and/or other components not shown in FIG. 16.

Logic processor 1602 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 1602 may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1602 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 1606 includes one or more physical devices configured to hold instructions executable by the logic processors to implement the methods and processes described herein. When such methods and processes are implemented, the state of non-volatile storage device 1606 may be transformed—e.g., to hold different data.

Non-volatile storage device 1606 may include physical devices that are removable and/or built-in. Non-volatile storage device 1606 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1606 may include nonvolatile, dynamic, static, read/write, read-only, sequential-access, location-addressable, file-addressable, and/or content-addressable devices. It will be appreciated that non-volatile storage device 1606 is configured to hold instructions even when power is cut to the non-volatile storage device 1606.

Volatile memory 1604 may include physical devices that include random access memory. Volatile memory 1604 is typically utilized by logic processor 1602 to temporarily store information during processing of software instructions. It will be appreciated that volatile memory 1604 typically does not continue to store instructions when power is cut to the volatile memory 1604.

Aspects of logic processor 1602, volatile memory 1604, and non-volatile storage device 1606 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 1608 may be used to present a visual representation of data held by non-volatile storage device 1606. The visual representation may take the form of a graphical user interface (GUI). As the herein described methods and processes change the data held by the non-volatile storage device, and thus transform the state of the non-volatile storage device, the state of display subsystem 1608 may likewise be transformed to visually represent changes in the underlying data. Display subsystem 1608 may include one or more display devices utilizing virtually any type of technology. Such display devices may be combined with logic processor 1602, volatile memory 1604, and/or non-volatile storage device 1606 in a shared enclosure, or such display devices may be peripheral display devices.

When included, input subsystem 1610 may comprise or interface with one or more user-input devices such as a keyboard, mouse, touch screen, microphone for speech and/or voice recognition, a camera (e.g., a webcam), or game controller.

When included, communication subsystem 1612 may be configured to communicatively couple various computing devices described herein with each other, and with other devices. Communication subsystem 1612 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some implementations, the communication subsystem may allow computing system 1600 to send and/or receive messages to and/or from other devices via a network such as the Internet.

In an example, a method for customizing interactive control of a large-format touch-sensitive display device (LFTSDD) comprises receiving, via a camera of the LFTSDD, one or more images of a scene in front of the LFTSDD, computer-analyzing the one or more images to recognize a human subject in the scene and a location of the human subject relative to the LFTSDD, determining a variable interaction zone of a display screen of the LFTSDD based at least on the recognized location of the human subject relative to the LFTSDD, the variable interaction zone being smaller than the display screen and positioned a designated distance in front of the human subject on the display screen based at least on the recognized location of the human subject relative to the LFTSDD, and visually presenting a touch control affordance in the variable interaction zone of the display screen of the LFTSDD that facilitates the human subject providing touch input at the touch control affordance from the recognized location. In this example and/or other examples, computer-analyzing may comprise computer analyzing the one or more images to identify an above-threshold motion in the scene, and in response to identifying the above-threshold motion, computer analyzing at least a motion region in the one or more images to identify the human subject in the motion region. In this example and/or other examples, computer-analyzing may comprise providing the one or more images to a machine-learning model previously-trained to recognize the presence of a human subject within an image. In this example and/or other examples, the machine learning model may include a neural network previously-trained with training data including a plurality of ground-truth labeled images of human subjects captured by a training-compatible camera relative to the camera of the LFTSDD. In this example and/or other examples, computer-analyzing may comprise recognizing the human subject based at least on the location of the human subject being within a threshold distance of the LFTSDD. In this example and/or other examples, the touch control affordance may be positioned in the variable interaction zone based at least on user preferences of the human subject determined from a user-specific profile. In this example and/or other examples, the user preferences of the human subject may indicate a dominant hand of the human subject, and wherein the touch control affordance is positioned in the variable interaction zone based at least on a location of the dominant hand of the human subject. In this example and/or other examples, the method may further comprise detecting touch input to the LFTSDD via a touch sensor, associating the touch input with an application program executed by the LFTSDD, and the touch control affordance may be an application-specific touch control affordance configured to control operation of the application program. In this example and/or other examples, the method may further comprise computer-analyzing the one or more images to recognize a plurality of human subjects in the scene and a location of each of the plurality of human subjects relative to the LFTSDD, detecting touch input to the LFTSDD via a touch sensor, associating the touch input with a human subject of the plurality of human subjects, and the variable interaction zone may be positioned on the display screen a designated distance in front of the human subject associated with the touch input based at least on the recognized location of the human subject relative to the LFTSDD. In this example and/or other examples, the method may further comprise receiving a voice command via a microphone of the LFTSDD, and the touch control affordance may be visually presented in the variable interaction zone of the display screen based at least on receiving the voice command. In this example and/or other examples, the method may further comprise receiving, via an active stylus communicatively coupled with the LFTSDD, a control signal, and the touch control affordance may be visually presented in the variable interaction zone of the display screen based at least on receiving the control signal from the active stylus. In this example and/or other examples, the camera may be a wide-angle visible-light camera. In this example and/or other examples, the camera may be a wide-angle infrared camera.

In another example, a large-format touch-sensitive display device (LFTSDD), comprises a camera, a large-format touch-sensitive display screen, a logic processor, and a storage device holding instructions executable by the logic processor to receive, via the camera, one or more images of a scene in front of the LFTSDD, computer-analyze the one or more images to recognize a human subject in the scene and a location of the human subject relative to the LFTSDD, determine a variable interaction zone of the display screen of the LFTSDD based at least on the recognized location of the human subject relative to the LFTSDD, the variable interaction zone being smaller than the display screen and positioned a designated distance in front of the human subject on the display screen based at least on the recognized location of the human subject relative to the LFTSDD, and visually present a touch control affordance in the variable interaction zone of the display screen of the LFTSDD that facilitates the human subject providing touch input at the touch control affordance from the recognized location. In this example and/or other examples, the camera may be a wide-angle visible-light camera. In this example and/or other examples, the one or more images may be computer analyzed using a neural network previously-trained with training data including a plurality of ground-truth labeled images of human subjects captured by a training compatible camera relative to the camera of the LFTSDD. In this example and/or other examples, the touch control affordance may be positioned in the variable interaction zone based at least on user preferences of the human subject determined from a user-specific profile. In this example and/or other examples, the storage device may hold instructions executable by the logic processor to detect touch input to the LFTSDD via a touch sensor, associate the touch input with an application program executed by the LFTSDD, and the touch control affordance may be an application-specific touch control affordance configured to control operation of the application program. In this example and/or other examples, the storage device may hold instructions executable by the logic processor to computer-analyze the one or more images to recognize a plurality of human subjects in the scene and a location of each of the plurality of human subjects relative to the LFTSDD, detect touch input to the LFTSDD via a touch sensor, associate the touch input with a human subject of the plurality of human subjects, and the variable interaction zone may be positioned on the display screen a designated distance in front of the human subject associated with the touch input based at least on the recognized location of the human subject relative to the LFTSDD.

In yet another example, a method for customizing interactive control of a large-format touch-sensitive display device (LFTSDD) comprises receiving, via a wide-angle camera of the LFTSDD, one or more images of a scene in front of the LFTSDD, computer-analyzing the one or more images to recognize a human subject in the scene and a location of the human subject relative to the LFTSDD, determining a variable interaction zone of a display screen of the LFTSDD based at least on the recognized location of the human subject relative to the LFTSDD, the variable interaction zone being smaller than the display screen and positioned a designated distance in front of the human subject on the display screen based at least on the recognized location of the human subject relative to the LFTSDD, actively moving the variable interaction zone based at least on recognizing a changing location of the human subject relative to the LFTSDD, and visually presenting a touch control affordance in the variable interaction zone of the display screen of the LFTSDD that facilitates the human subject providing touch input at the touch control affordance from the recognized location.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for customizing interactive control of a large-format touch-sensitive display device (LFTSDD), the method comprising:

receiving, via a camera of the LFTSDD, one or more images of a scene in front of the LFTSDD;

computer-analyzing the one or more images to recognize a human subject in the scene and a location of the human subject relative to the LFTSDD including a direction in which the human subject is facing relative to the LFTSDD;

determining a variable interaction zone of a display screen of the LFTSDD based at least on the recognized location of the human subject relative to the LFTSDD and the direction in which the human subject is facing relative to the LFTSDD, the variable interaction zone being smaller than the display screen and positioned a designated distance in front of the human subject on the display screen in the direction in which the human subject is facing relative to the LFTSDD based at least on the recognized location of the human subject relative to the LFTSDD and the direction in which the human subject is facing relative to the LFTSDD; and visually presenting a touch control affordance in the variable interaction zone of the display screen of the LFTSDD at a position in the variable interaction zone that is determined based at least on the direction in which the human subject is facing relative to the LFTSDD, wherein the touch control affordance facilitates the human subject providing touch input at the touch control affordance from the recognized location.

2. The method of claim 1, wherein computer-analyzing comprises computer analyzing the one or more images to identify an above-threshold motion in the scene, and in response to identifying the above-threshold motion, computer analyzing at least a motion region in the one or more images to identify the human subject in the motion region and the direction in which the human subject is facing relative to the LFTSDD.

3. The method of claim 1, wherein computer-analyzing comprises providing the one or more images to a machine-learning model previously-trained to recognize the presence of a human subject within an image and the direction in which the human subject is facing relative to the LFTSDD.

4. The method of claim 3, wherein the machine learning model includes a neural network previously-trained with training data including a plurality of ground-truth labeled images of human subjects captured by a training-compatible camera relative to the camera of the LFTSDD.

5. The method of claim 1, wherein computer-analyzing comprises recognizing the human subject based at least on the location of the human subject being within a threshold distance of the LFTSDD.

6. The method of claim 1, wherein the touch control affordance is positioned in the variable interaction zone based at least on user preferences of the human subject determined from a user-specific profile.

7. The method of claim 6, wherein the user preferences of the human subject indicate a dominant hand of the human subject, and wherein the touch control affordance is positioned in the variable interaction zone based at least on a location of the dominant hand of the human subject.

8. The method of claim 1, further comprising:

detecting touch input to the LFTSDD via a touch sensor;

associating the touch input with an application program executed by the LFTSDD; and wherein the touch control affordance is an application-specific touch control affordance configured to control operation of the application program.

9. The method of claim 1, further comprising:

computer-analyzing the one or more images to recognize a plurality of human subjects in the scene and a location of each of the plurality of human subjects relative to the LFTSDD;

detecting touch input to the LFTSDD via a touch sensor;

associating the touch input with a human subject of the plurality of human subjects; and wherein the variable interaction zone is positioned on the display screen a designated distance in front of the human subject associated with the touch input based at least on the recognized location of the human subject relative to the LFTSDD.

10. The method of claim 1, further comprising:

receiving a voice command via a microphone of the LFTSDD; and wherein the touch control affordance is visually presented in the variable interaction zone of the display screen based at least on receiving the voice command.

11. The method of claim 1, further comprising:

receiving, via an active stylus communicatively coupled with the LFTSDD, a control signal; and wherein the touch control affordance is visually presented in the variable interaction zone of the display screen based at least on receiving the control signal from the active stylus.

12. The method of claim 1, wherein the camera is a wide-angle visible-light camera.

13. The method of claim 1, wherein the camera is a wide-angle infrared camera.

14. A method for customizing interactive control of a large-format touch-sensitive display device (LFTSDD), the method comprising:

receiving, via a wide-angle camera of the LFTSDD, one or more images of a scene in front of the LFTSDD;

computer-analyzing the one or more images to recognize a human subject in the scene and a location of the human subject relative to the LFTSDD including a direction in which the human subject is facing relative to the LFTSDD;

determining a variable interaction zone of a display screen of the LFTSDD based at least on the recognized location of the human subject relative to the LFTSDD and the direction in which the human subject is facing relative to the LFTSDD, the variable interaction zone being smaller than the display screen and positioned a designated distance in front of the human subject on the display screen in the direction in which the human subject is facing relative to the LFTSDD based at least on the recognized location of the human subject relative to the LFTSDD and the direction in which the human subject is facing relative to the LFTSDD;

actively moving the variable interaction zone based at least on recognizing a changing location of the human subject relative to the LFTSDD and/or a change in direction in which the human subject is facing relative to the LFTSDD; and visually presenting a touch control affordance in the variable interaction zone of the display screen of the LFTSDD at a position in the variable interaction zone that is determined based at least on the direction in which the human subject is facing relative to the LFTSDD, wherein the touch control affordance facilitates the human subject providing touch input at the touch control affordance from the recognized location.

* * * * *